(12) United States Patent
Allen et al.

(10) Patent No.: US 8,586,165 B2
(45) Date of Patent: Nov. 19, 2013

(54) METHOD AND MACHINE FOR MAKING FOAM CUSHIONS

(75) Inventors: Kurt William Allen, Lebanon, OH (US); Raymond Cherfane, Kennesaw, GA (US); Jean-Marc Slovencik, Uhrwiller (FR); Thomas George Eckel, Milford, OH (US)

(73) Assignee: Storopack, Inc., Cincinnati, OH (US)

( * ) Notice: Subject to any disclaimer, the term of this patent is extended or adjusted under 35 U.S.C. 154(b) by 339 days.

(21) Appl. No.: 12/724,136

(22) Filed: Mar. 15, 2010

(65) Prior Publication Data

US 2010/0230032 A1 Sep. 16, 2010

Related U.S. Application Data

(60) Provisional application No. 61/160,480, filed on Mar. 16, 2009.

(51) Int. Cl.
*B65D 81/107* (2006.01)

(52) U.S. Cl.
USPC ............................................. 428/71; 428/158

(58) Field of Classification Search
CPC ........................... B65D 81/107; B65D 81/127
USPC ............ 428/71, 158–160, 178; 206/586, 523; 248/345.1
See application file for complete search history.

(56) References Cited

U.S. PATENT DOCUMENTS

| | | | |
|---|---|---|---|
| 2,738,834 A * | 3/1956 | Jaffe et al. | ............................ 5/420 |
| 2,779,689 A | 1/1957 | Reis, Jr. | |
| 3,099,518 A | 7/1963 | Wetzler | |
| 3,485,347 A | 12/1969 | McGill et al. | |
| 4,002,289 A | 1/1977 | Moore | |
| 4,390,337 A | 6/1983 | Gately | |
| 4,428,530 A | 1/1984 | Chabria | |
| 4,674,268 A | 6/1987 | Gavronsky et al. | |
| 4,854,109 A | 8/1989 | Pinarer et al. | |
| 5,022,217 A | 6/1991 | Vilas Boas et al. | |
| 5,376,219 A | 12/1994 | Sperry et al. | |
| 5,679,208 A | 10/1997 | Sperry et al. | |
| 5,699,902 A | 12/1997 | Sperry et al. | |
| 5,727,370 A | 3/1998 | Sperry | |
| 5,913,603 A | 6/1999 | Sperry et al. | |
| 6,131,375 A | 10/2000 | Sperry | |

(Continued)

FOREIGN PATENT DOCUMENTS

| | | |
|---|---|---|
| GB | 2080734 | 2/1982 |
| WO | 97/48606 | 12/1997 |

OTHER PUBLICATIONS

TOSS, The Optimum Sealing System, copyright 2010, Toss Machine Components, Inc., 3 pages.

(Continued)

*Primary Examiner* — Alexander Thomas
(74) *Attorney, Agent, or Firm* — Wood, Herron & Evans, LLP

(57) ABSTRACT

A machine for forming foam cushions comprises a web of film comprising a pair of film panels positioned face to face and having first and second lengthwise edges, and first and second foam dispensing assemblies positioned to dispense foam between the film panels, each foam dispensing assembly comprising first and second valves that dispense first and second foam components, respectively, the valves positioned so that respective foam component streams exiting the valves intersect.

22 Claims, 19 Drawing Sheets

(56) References Cited

U.S. PATENT DOCUMENTS

| | | |
|---|---|---|
| 6,199,349 B1 | 3/2001 | Lerner |
| 6,234,777 B1 | 5/2001 | Sperry et al. |
| 6,289,649 B1 | 9/2001 | Cherfane |
| 6,311,740 B1 | 11/2001 | Sperry et al. |
| 6,472,638 B1 | 10/2002 | Sperry et al. |
| 6,550,229 B2 | 4/2003 | Sperry et al. |
| 7,225,599 B2 | 6/2007 | Sperry et al. |
| 7,247,219 B2 | 7/2007 | O'Dowd |
| 7,341,632 B2 | 3/2008 | Noble |
| 7,607,911 B2 | 10/2009 | Sperry et al. |
| 2009/0243135 A1 | 10/2009 | Sperry et al. |
| 2010/0092758 A1 | 4/2010 | Slovencik |

OTHER PUBLICATIONS

PCT/US2010/027424, Invitation to Pay Additional Fees and Communication Relating to the Results of the Partial International Search, 8 pages, Sep. 20, 2010.

PCT/US2010/027424, Notification of Transmittal of the International Search Report and the Written Opinion of the International Searching Authority, 19 pages, Nov. 30, 2010.

\* cited by examiner

METHOD AND MACHINE FOR MAKING FOAM CUSHIONS

RELATED APPLICATIONS

This application claims the benefit of provisional Application Ser. No. 61/160,480 filed Mar. 16, 2009, the entire substance of which is hereby incorporated by reference herein as if fully set forth in its entirety.

FIELD

This relates generally to protective packaging, and more particularly to methods and machines for making foam cushions for use as protective packaging.

BACKGROUND

Foam cushions are a known form of protective packaging. U.S. Pat. Nos. 6,131,375 ("'375 patent") and 5,727,370 ("'370 patent") are exemplary of machines for making foam cushions. The '375 and '370 patents disclose a protective foam cushion making apparatus that dispenses reactive foam components into an interior space between two panels of plastic film to form protective foam cushions. The '375 and '370 patents are incorporated by reference herein as if fully set forth in their entirety.

It is desirable to improve upon the machines of the '375 and '370 patents.

SUMMARY

In a first aspect, a machine for forming foam cushions comprises a web of film comprising a pair of film panels positioned face to face and having first and second lengthwise edges, and first and second foam dispensing assemblies positioned to dispense foam between the film panels, each foam dispensing assembly comprising first and second valves that dispense first and second foam components, respectively, the valves positioned so that respective foam component streams exiting the valves intersect, the foam dispensing assemblies spaced from one another, the first foam dispensing assembly spaced from the first lengthwise edge of the web of film, the second foam dispensing assembly spaced from the second lengthwise edge of the web of film.

The first foam dispensing assembly can be spaced from the first lengthwise edge of the web of film a first distance, the second foam dispensing assembly can be spaced from the second lengthwise edge of the web of film a second distance, and the foam dispensing assemblies can be spaced from one another a third distance; the first, second, and third distances can be about the same. The machine can further comprise a film driving assembly that drives the web of film relative to the first and second foam dispensing assemblies. The film driving assembly can comprise a pair of opposing rollers, at least one roller of the pair being driven. Each of the pair of rollers can comprise a resilient roller, a rigid roller, or a resilient roller and a rigid roller.

In a second aspect, a machine for forming foam cushions comprises a web of film comprising a pair of film panels positioned face to face and having first and second lengthwise edges, a foam dispensing assembly positioned to dispense foam between the film panels, and a gas injection assembly that injects a gas between the film panels to aid in separating the film panels.

The gas injected by the gas injection assembly between the film panels to aid in separating the film panels can be air.

In a third aspect, a machine for forming foam cushions comprises a web of film comprising a pair of film panels positioned face to face and having first and second lengthwise edges, a foam dispensing assembly positioned to dispense foam between the film panels, and a combination rotary heat sealing and cutting device that forms successive crosswise seals in the web of film and that separates adjacent foam cushions from one another between adjacent ones of the successive crosswise seals in the web of film.

In a fourth aspect, a machine for forming foam cushions comprises a web of film comprising a pair of film panels positioned face to face and having first and second lengthwise edges, and a pair of foam dispensing assemblies positioned to dispense foam between the film panels, each foam dispensing assembly comprising first and second valves that dispense first and second foam components, respectively, the valves positioned so that respective foam component streams exiting the valves intersect, wherein the web of film is a sheet of film folded lengthwise along a fold corresponding to the first lengthwise edge of the web of film, the folded sheet of film having first and second free edges corresponding to the second lengthwise edge of the web of film, the machine further comprising a sealing assembly that forms a lengthwise seal in the web of film along the second lengthwise edge of the web of film.

The sealing assembly can comprise a rotary heat sealing device. The rotary heat sealing device can be configured to periodically move out of contact with the web of film to provide unsealed regions serving as vents for the foam.

In a fifth aspect, a machine for forming foam cushions comprises a web of film comprising a pair of film panels positioned face to face and having first and second lengthwise edges, and a foam dispensing assembly positioned to dispense foam between the film panels, the foam dispensing assembly comprising first and second valves that dispense first and second foam components, respectively, the valves positioned so that respective foam component streams exiting the valves intersect, each of the first and second valves comprising a valve housing, a valve needle in the valve housing, and a spring normally biasing the valve needle to a closed position in the valve housing.

Each of the first and second valves can further comprise an actuator that moves the valve needle against the bias of the spring to open the valve. Each of the first and second valves can further comprise a membrane that seals the valve needle relative to the valve housing, the membrane positioned upstream of a point of entry of the foam component into the valve housing. The valve needle can further comprise a shoulder, the valve housing can further comprise a cooperating shoulder, the valve needle shoulder seats against the valve housing shoulder to prevent the foam component from escaping out of an orifice of the valve housing when the valve is closed. The valve needle can extend out of the orifice of the valve housing when the valve is closed.

In a sixth aspect, a machine for forming foam cushions comprises a web of film comprising a pair of film panels positioned face to face and having first and second lengthwise edges, a foam dispensing assembly positioned to dispense foam between the film panels, the foam dispensing assembly comprising first and second valves that dispense first and second foam components, respectively, the valves positioned so that respective foam component streams exiting the valves intersect, and a preheated reservoir for each of the first and second foam components downstream of a supply of the respective foam component and upstream of the valve of the respective foam component.

In another aspect, a method of producing a cushion for cushioning an item to be shipped comprises the steps of providing a web of film comprising a pair of film panels positioned face to face, providing first and second laterally spaced apart foam dispensing assemblies positioned to dispense foam between the film panels, each foam dispensing assembly comprising first and second valves that dispense first and second foam components, respectively, the valves positioned so that respective foam component streams exiting the valves intersect, advancing the web of film while dispensing foam from the foam dispensing assemblies on as create a pair of strips of foam between the film panels, and separating a selected length of the web of film to form the cushion.

In another aspect, a method of cushioning an item to be shipped comprises the steps of providing a web of film comprising a pair of film panels positioned face to face, providing first and second laterally spaced apart foam dispensing assemblies positioned to dispense foam between the film panels, each foam dispensing assembly comprising first and second valves that dispense first and second foam components, respectively, the valves positioned so that respective foam component streams exiting the valves intersect, advancing the web of film while dispensing foam from the foam dispensing assemblies so as create a pair of strips of foam between the film panels, separating a selected length of the web of film to form a cushion, and wrapping the item to be shipped with the cushion by utilizing the film panels between the pair of foam strips as a living hinge to facilitate wrapping of the item.

In another aspect, a machine for forming foam cushions comprises a web of film comprising a pair of film panels positioned face to face and having first and second lengthwise edges, and first and second foam dispensing assemblies positioned to dispense foam between the film panels, each foam dispensing assembly comprising first and second valves that dispense first and second foam components, respectively, the valves positioned so that respective foam component streams exiting the valves intersect.

The machine can further comprise a variable speed film feed mechanism for varying the amount of foam dispensed between the film panels per unit length of the web of film.

The machine can further comprise a combination heat sealing and cutting device that selectively either a) forms a crosswise seal in the web of film, or b) forms a crosswise seal in the web of film and severs adjacent foam cushions from one another by severing the web of film within the crosswise seal in the web of film. The combination heat sealing and cutting device can comprise a variable voltage heated bar selectively movable into and out of contact with the web of film, the heated bar supplied with a higher voltage to seal and sever, the heated bar supplied with a lower voltage to seal only. The combination heat sealing and cutting device can further comprise an actuator and a backer bar, the actuator operable to move the heated bar into and out of contact with the web of film, the actuator operable to trap the web of film between the heated bar and the backer bar during sealing and during sealing and severing. The heated bar can comprise a heating element band having a non-planar cross-section. The heating element band cross-section can have opposed edge regions and a central region, and the central region can project away from the opposed edge regions and toward the backer bar.

The first and second foam dispensing assemblies can be mounted to a heated plate of the machine. The heated plate can be a manifold plate with foam component passages therein and a heater element therein. The machine can further comprise a supply of a first foam component and a supply of a second foam component, each supply connected to the machine with a respective supply hose, each supply hose including a heated wire therein.

The machine can further comprise a first supply drum of the first foam component and a second supply drum of the second foam component, a first supply pump connected on one side and positioned external to the first supply drum and connected on the other side to the first valves, and a second supply pump connected on one side and positioned external to the second supply drum and connected on the other side to the second valves.

The machine can further comprise primary drive rollers and idler rollers, and secondary drive rollers and idler rollers downstream of the primary drive rollers and idler rollers. Each of the primary drive and idler rollers can comprise a first relatively rigid roller outboard of the first foam dispensing assembly, a second relatively rigid roller outboard of the second foam dispensing assembly, a third relatively rigid roller between the first and second foam dispensing assemblies, a first relatively flexible roller generally aligned with the first foam dispensing assembly, and a second relatively flexible roller generally aligned with the second foam dispensing assembly. The first, second, and third relatively rigid rollers can comprise polyurethane or rubber rollers and the first and second relatively flexible rollers can comprise bristle brush rollers. Each of the first and second valves can have a center line axis and a nozzle with a distal end, each of the primary drive and idler rollers can have a center line axis, each of the first and second valves can be angled about 22.5 degrees from perpendicular to the primary drive and idler rollers center line axes in opposite directions, and the distal ends of the nozzles are positioned about 0.8 mm downstream of the primary drive and idler rollers center line axes. The center line axes of the first and second valves can intersect about 8.3 mm downstream of the primary drive and idler rollers center line axes. Each of the secondary drive and idler rollers can comprise a first relatively rigid roller outboard of the first foam dispensing assembly, and a second relatively rigid roller outboard of the second foam dispensing assembly. The secondary driver rollers can further comprise third and fourth rollers each generally aligned with one of the dispensing assemblies, each of the third and fourth rollers having reduced diameter end portions and an increased diameter central portion, The secondary idler rollers can further comprise fifth and sixth rollers each generally aligned with one of the dispensing assemblies, each of the fifth and sixth rollers having increased diameter end portions and a decreased diameter central portion. The first, second, third, and fourth secondary rollers can comprise polyurethane or rubber rollers.

The machine can further comprise an idler roller positioned downstream of the supply and upstream of the dispensing assemblies over which the web of film passes, a divider for separating the pair of film panels so that one film panel of the pair of film panels is positioned forward of the dispensing assemblies and the other film panel of the pair of film panels is positioned rearward of the dispensing assemblies, a first sensor associated with the idler roller which detects rotation of the roller induced by the web of film passing thereover, and a second sensor associated with the divider which detects the one film panel forward of the dispensing assemblies and the other film panel rearward of the dispensing assemblies. The first sensor can be an encoder comprising a magnetic element mounted adjacent an end of the idler roller, the end of the idler roller having holes therein spaced circumferentially therearound, whereby rotation of the idler roller is sensed by the magnetic element as the holes pass over the magnetic element. The second sensor can be a photo eye comprising a double ended infrared light transmitter and receiver, whereby when one film panel is forward of the infrared light transmitter and receiver and the other film panel is rearward of the infrared light transmitter and receiver, infrared light from the transmitter is reflected by the film panels and is received by the receiver thereby indicating that the film panels are properly located.

The first and second valves can each comprise a valve housing, a plunger positioned in the valve housing, a needle guide mounted on a distal end of the valve housing, a nozzle mounted on a distal end of the needle guide, and a needle mounted on a distal end of the plunger. Each of the first and second valves can further comprise a bellows spring operable between the plunger and the valve housing and normally biasing the plunger and hence the needle to a closed position. Each of the first and second valves can further comprise a plug secured to a proximal end of the valve housing, the bellows spring secured to the plunger and compressed against the plug during retraction of the plunger and hence the needle. The plunger can further comprise a shoulder, the needle guide can further comprise a cooperating shoulder, the plunger shoulder seats against the needle guide shoulder to prevent the foam component from escaping out of the orifice when the valve is closed, the needle extending out of the orifice of the nozzle when the valve is closed.

The machine can further comprise a frame, the web of film and the dispensing assemblies mounted on said frame, the frame including a frame base, the base supporting an electronics box for housing electronics of the machine.

The dispensing assemblies can be mounted in a film divider structure, and the divider structure can be hinged at one side to the machine so as to be able to be pivoted about a generally vertical axis away from the machine to facilitate loading the film web.

The primary idler rollers and said secondary idler rollers can be mounted in a cover that is hinged at one end to the machine so as to be able to be pivoted about a generally horizontal axis away from the machine to provide access to the primary drive rollers and the secondary drive rollers.

DRAWINGS

DESCRIPTION

Figure 1:
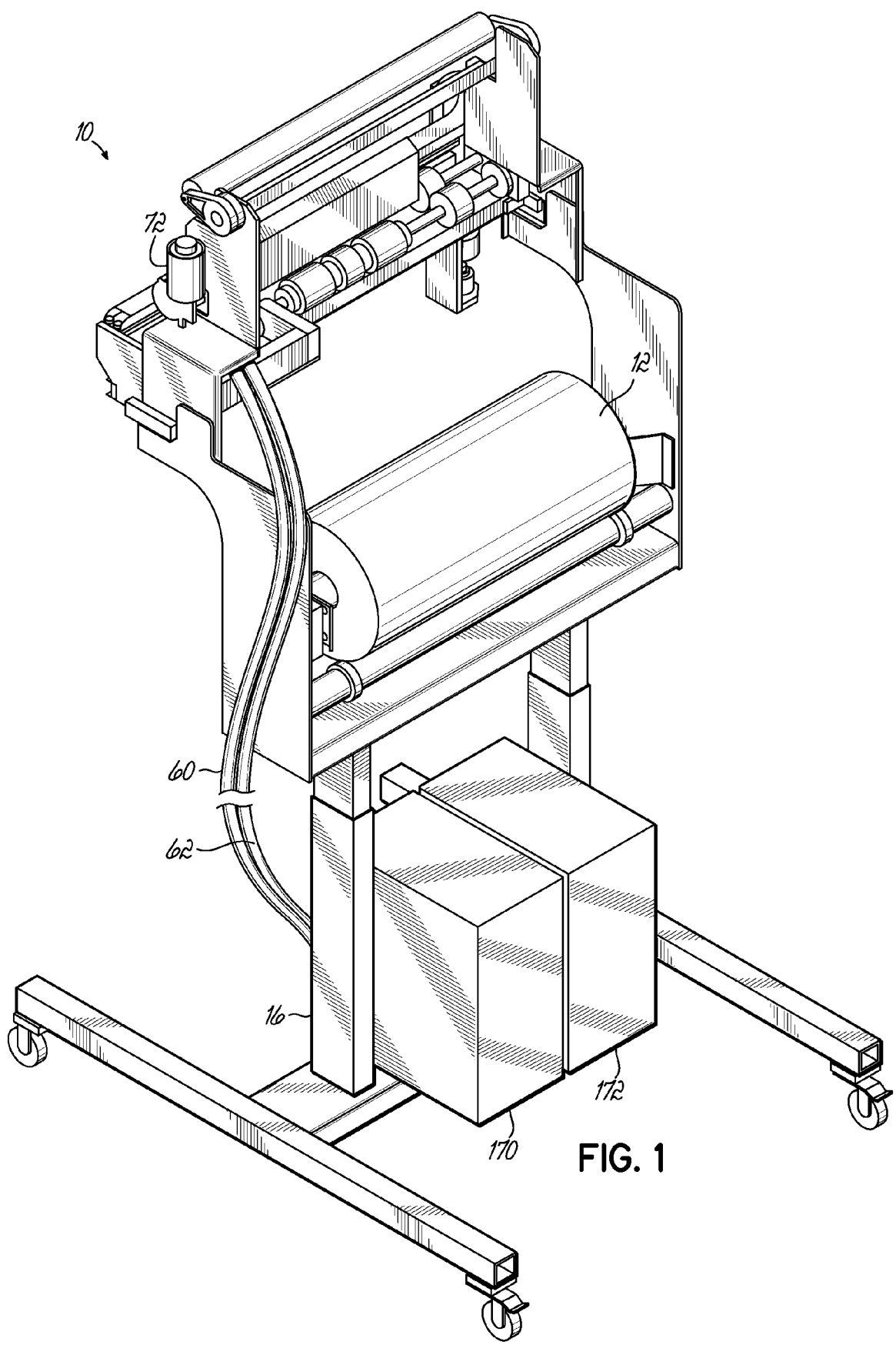
FIG. 1 is a rear perspective view of a machine for making foam cushions.
Figure 2:
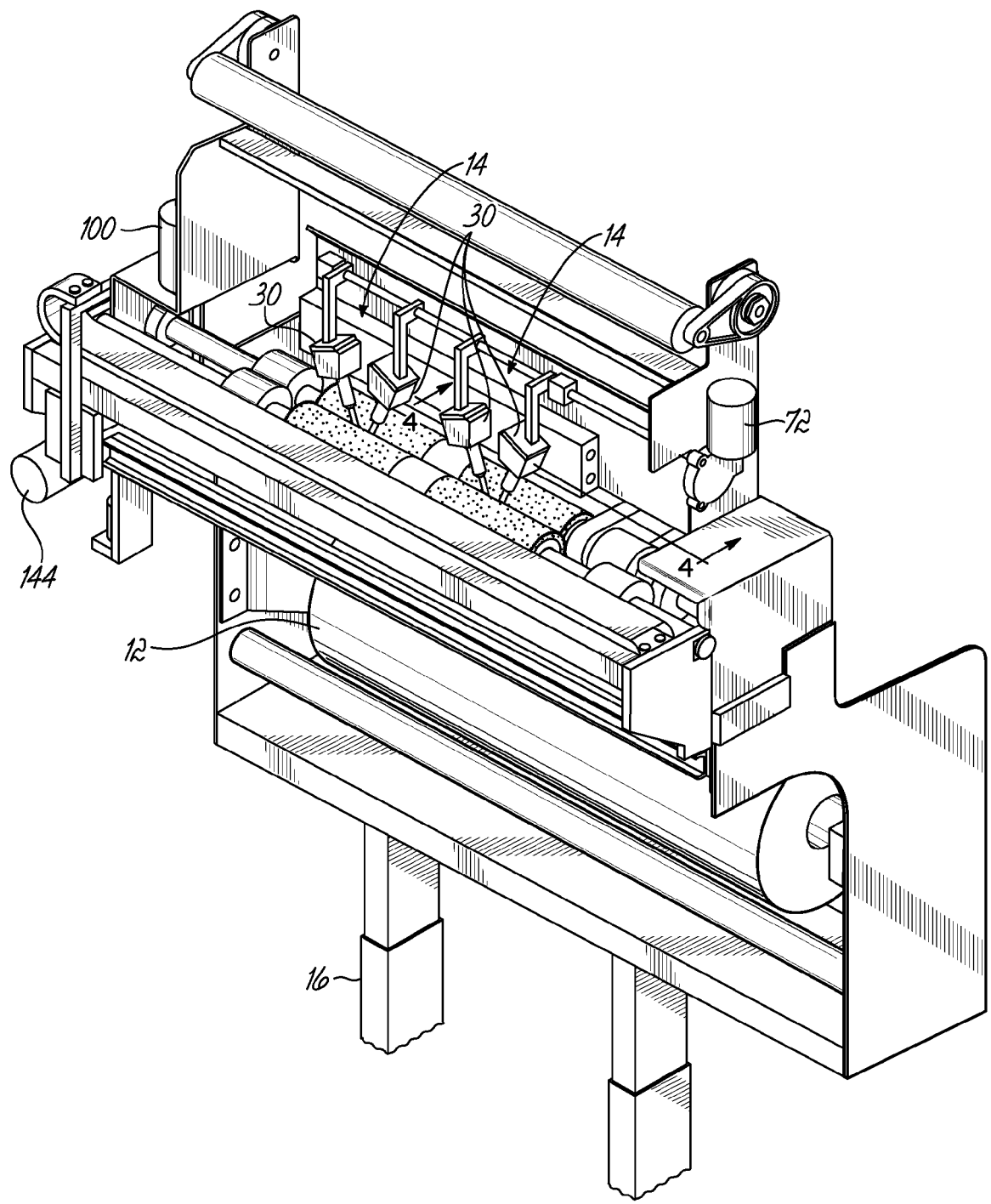
FIG. 2 is a front perspective view, partially broken away, of the machine of FIG. 1.
Figure 3:
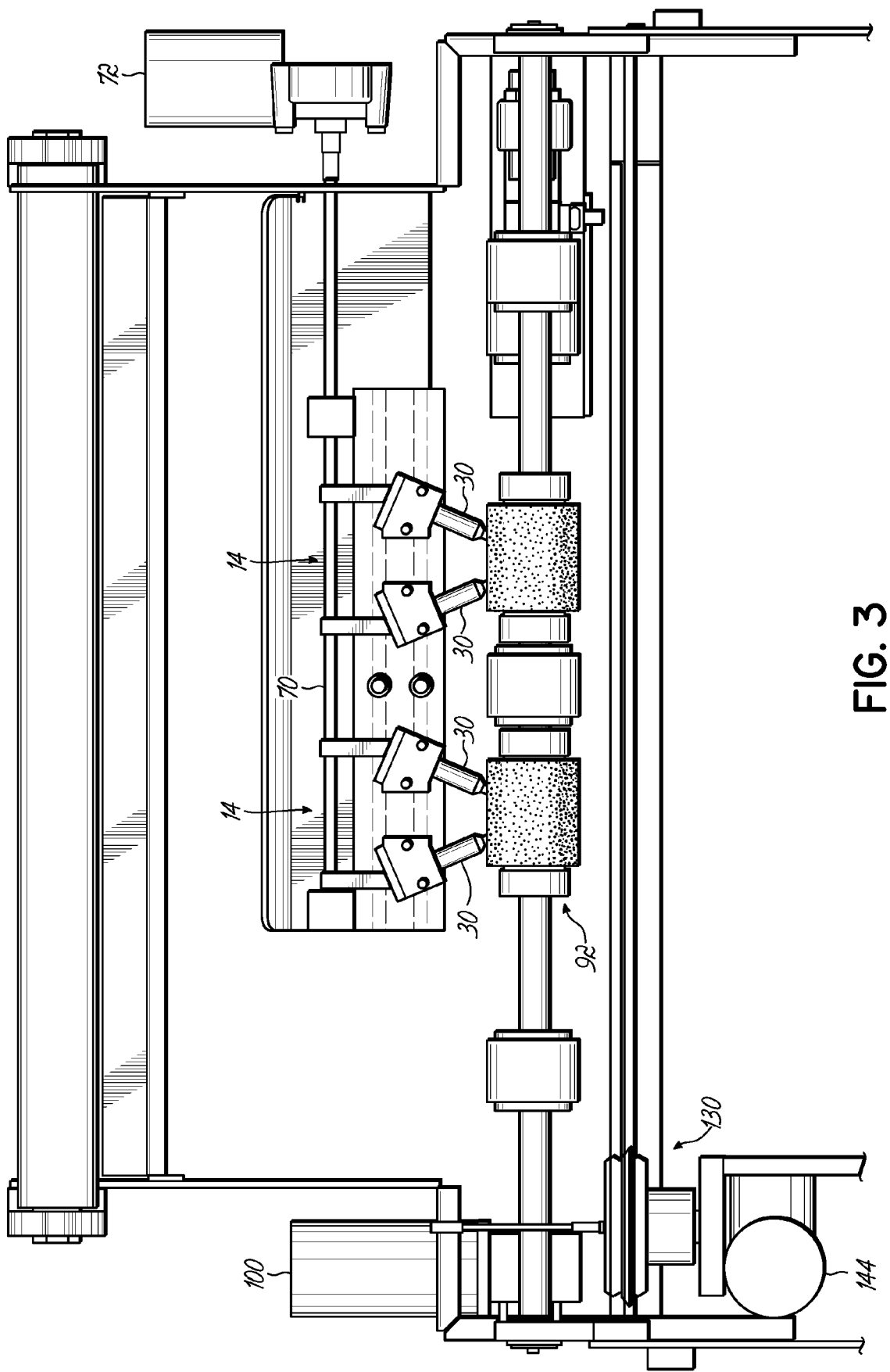
FIG. 3 is a front view, partially broken away, of the machine of FIG. 1.
Figure 4A:
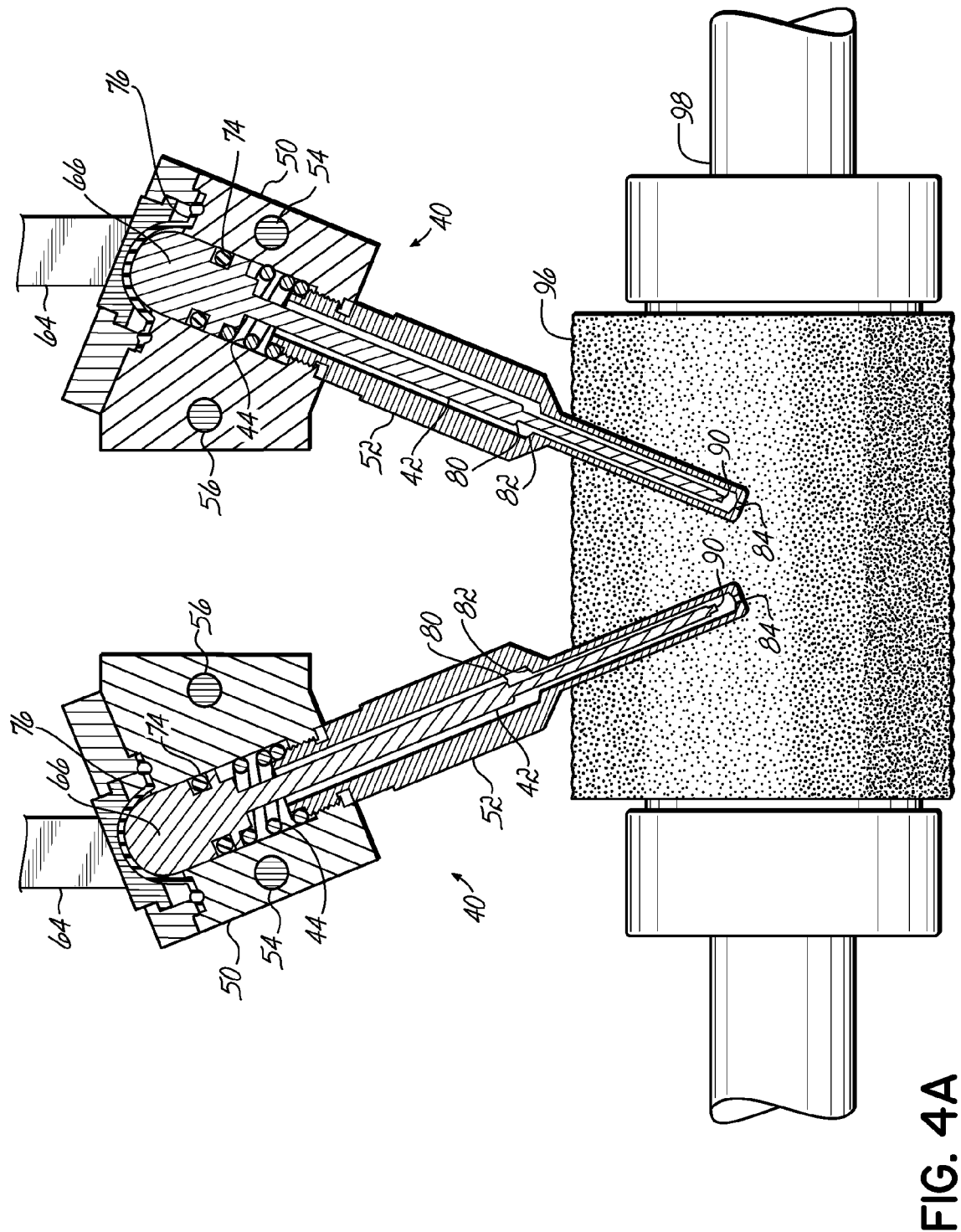
FIGS. 4A and 4B are cross-sectional views taken along line 4-4 in FIG. 2.
Figure 4B:
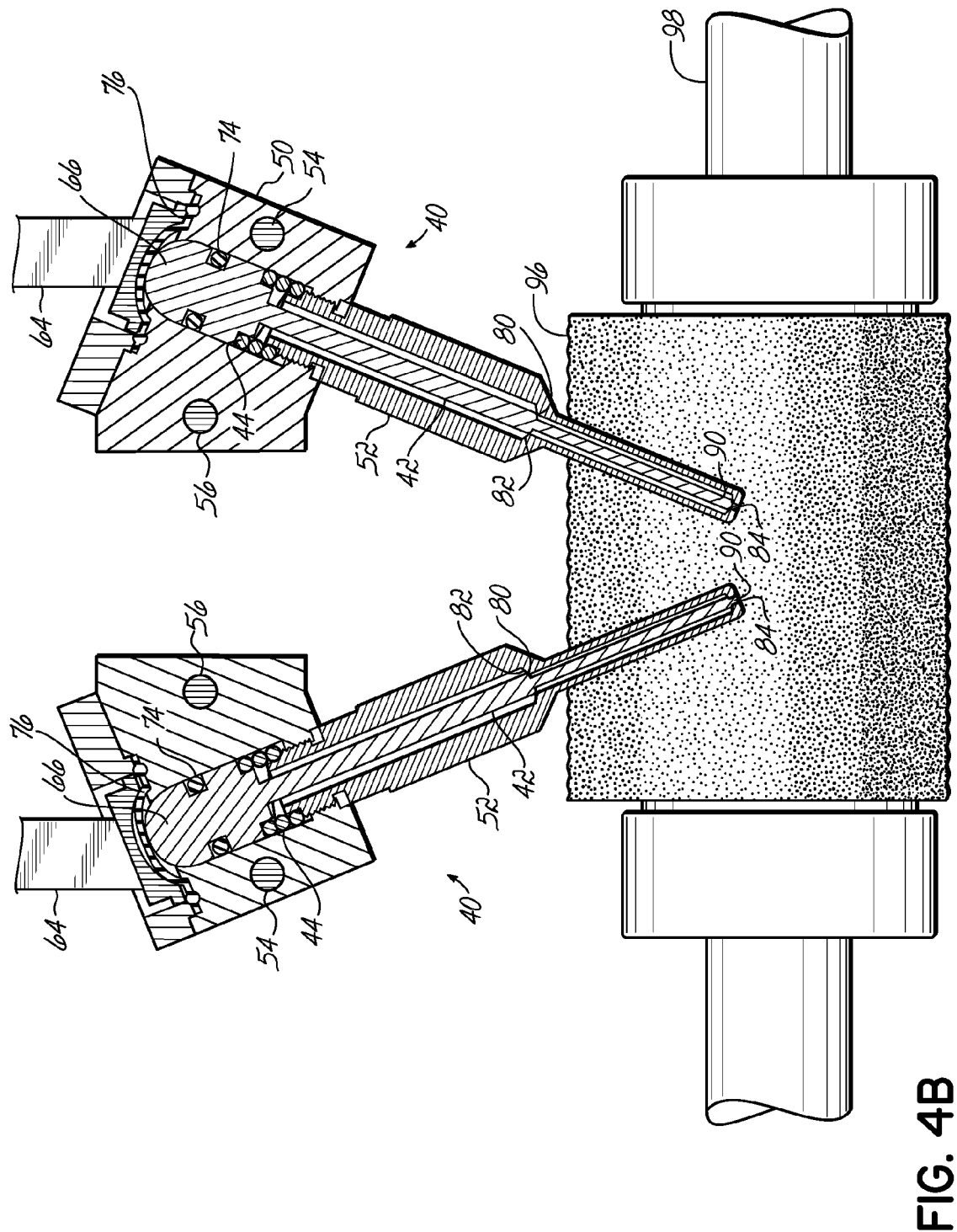

Referring first to FIGS. 1-8, a machine 10 for forming foam cushions is illustrated. The machine comprises, broadly, a supply of a web of plastic film 12 and a pair of foam dispensing assemblies 14, 14. The film supply 12 and pair of foam dispensing assemblies 14, 14 can be supported on a machine frame 16. While a pair of dispensing assemblies 14, 14 are illustrated, the machine 10 could include more than two dispensing assemblies.

Figure 5:
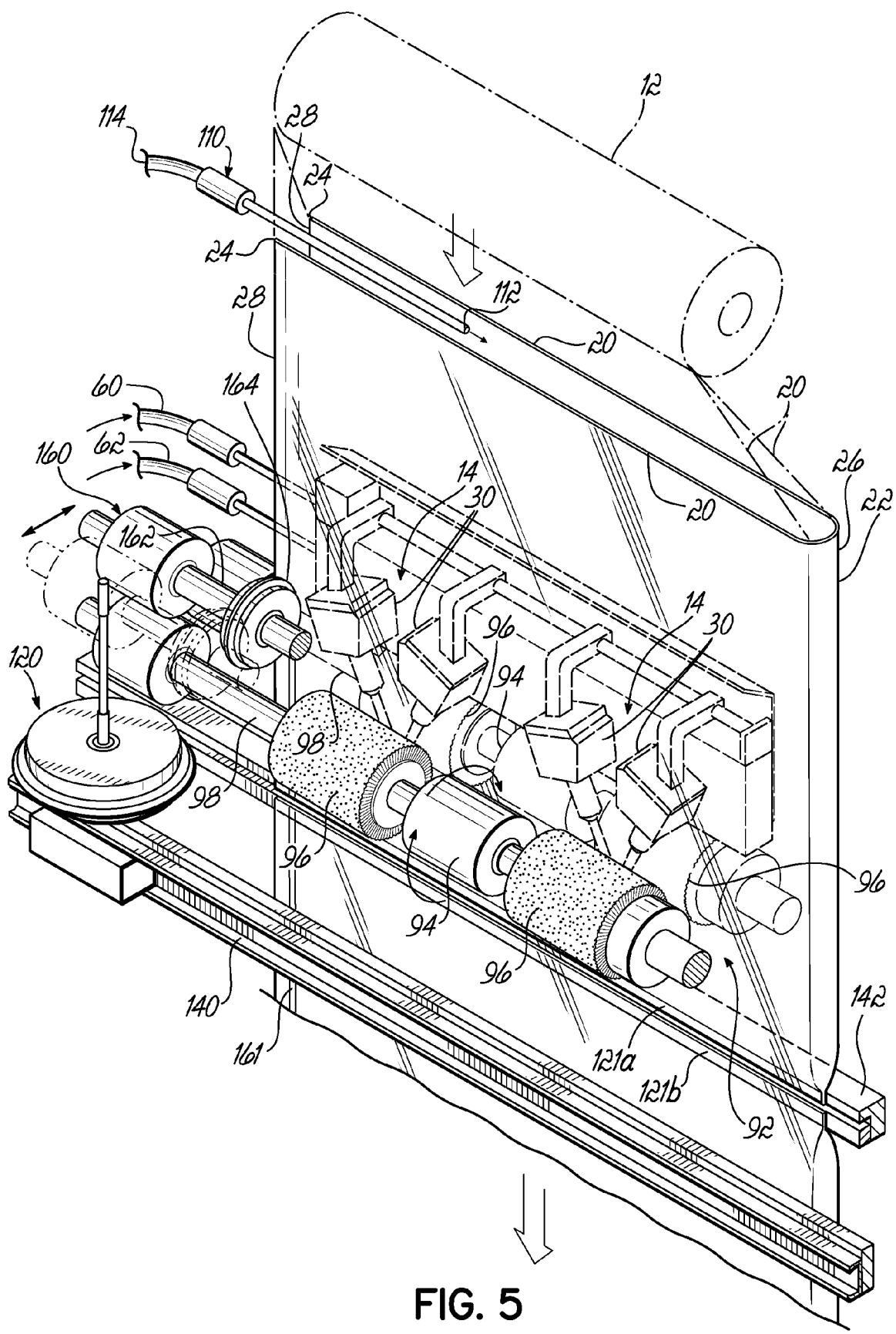
FIG. 5 is another front perspective view, partially broken away, of the machine of FIG. 1.

Referring to FIG. 5, the web of film 12 comprises a pair of film panels 20, 20 positioned face-to-face, each having first 22 and second 24 lengthwise edges. For example and as illustrated, the web of film 12 can be a sheet of film folded lengthwise along a fold 26. In that case, the fold 26 is the first 22 lengthwise edge of both of the panels 20, 20. The folded sheet of film has a pair of free edges 28, 28 which are the second lengthwise edges 24, 24 of the panels 20, 20. The web of film 12 could be formed to include a gusset fold (not shown) at one or both of the lengthwise edges 22, 24. Such gusset(s) allow the film panels 20, 20 to expand and separate during expansion of the forming foam.

Referring to FIGS. 2-5, the foam dispensing assemblies 14, 14 are positioned to dispense foam between the film panels 20, 20. Each foam dispensing assembly 14 comprises first and second valve assemblies 30, 30. The valve assemblies 30, 30 of each foam dispensing assembly 14 are positioned and oriented such that the respective foam components, for example isocyanate and polyol, exiting from them intersect to form foam, for example polyurethane foam. The foam dispensing assemblies 14, 14 can be positioned such that the two assemblies 14, 14 5 are spaced apart. One of the assemblies 14 can be spaced from the first lengthwise edge 22 and the other one of the assemblies 14 can be spaced from the second lengthwise edge 24. For example, the assemblies 14, 14 can be evenly spaced apart from one another and from their respective adjacent edge 22, 24.

For example, each valve assembly 30 of each foam dispensing assembly 14 has a valve housing 40, a valve needle 42 in the housing 40, and a spring 44 normally biasing the valve needle 42 to a closed position in the valve housing 40. For example, valve housing 40 can have a base 50 and an extension 52 threaded into base 50. Inlets 54, 56 supply first and second foam precursor components to valve assembly 30 from first and second foam precursor supply lines 60, 62, respectively. An actuator 64 is adapted to apply and remove a force to and from the end 66 of the valve needle 42 in order to open and close the valve assembly 30. For example, actuator 64 can be a lever attached to a shaft 70 which is rotated by a motor 72. The valve needle 42 can include an O-ring 74 around the circumference of the end 66 of the valve needle 42 to aid in preventing the foam precursor components from escaping. A membrane 76 can be included to further aid in preventing the foam precursor components from escaping. For example, the valve needle 42 includes a shoulder 80 and the extension 52 of the valve housing 40 includes a cooperating shoulder 82 that the shoulder 80 of the valve needle 42 seats against to close off the orifice 84 of the extension 52 out of which the foam components pass. The valve needle 42 includes a tip 90 that can extend out of, or beyond the end of, the extension 52 and provide a self-cleaning function for the orifice 84 during actuation of the valve needle 42.

Referring to FIG. 5, the machine 10 can further include a driving assembly 92 that drives the web of film 12 relative to the foam dispensing assemblies 14, 14. For example, driving assembly 92 can comprise a pair of opposing rollers. For example, driving assembly 92 can include a pair of opposing rigid rollers 94, 94 and two pairs of opposing resilient rollers 96, 96. The various roller pairs can be mounted on respective rotating shafts 98, 98. One or both of the shafts 98, 98 can be driven by a motor 100.

Referring still to FIG. 5, to aid in pre-separating the film panels 20, 20, a gas injection assembly 110 can be included in the machine 10 upstream of the foam dispensing assemblies 14, 14. Gas injection assembly 110 can take the form of a nozzle 112 connected to a source 114 of compressed air.

Figure 6:
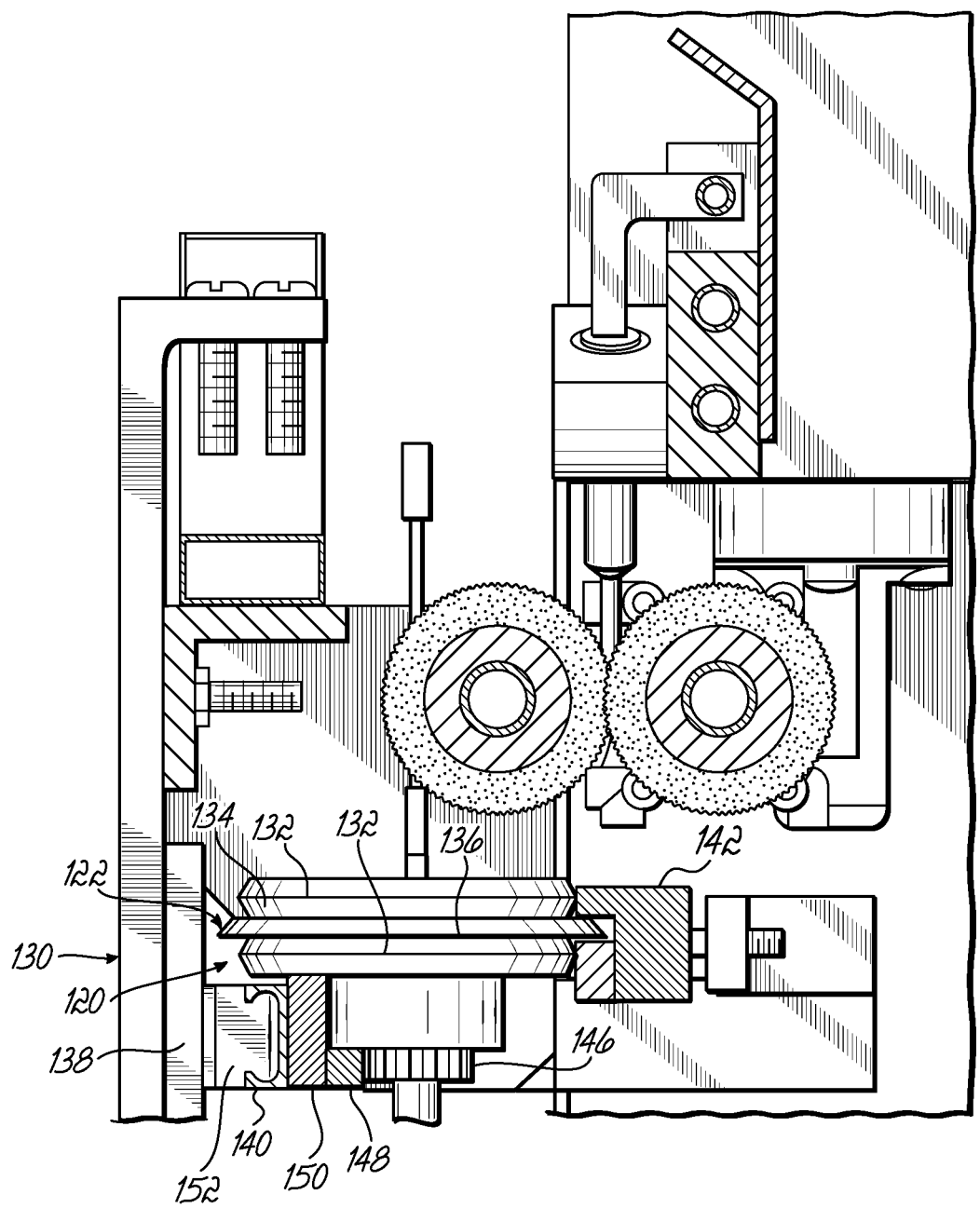
FIG. 6 is an end view, partially broken away, of the machine of FIG. 1.

Referring to FIGS. 5 and 6, the machine 10 can also include a sealing assembly 120 that forms successive crosswise end seals in the web of film 12, and a separation assembly 122 that separates adjacent foam cushions from one another between adjacent ones of the crosswise end seals formed in the web of film 12. For example, the sealing and separation assemblies 120, 122 can take the form of a combination rotary heat sealing and cutting device 130. For example, the device 130 can have a pair of heating elements 132, 132 mounted on either end of wheel 134 therearound and a cutting blade 136 positioned between the heating elements 132, 132 and mounted on wheel 134 therearound. The wheel 134 can be rotatably mounted on a plate 138 that is configured to travel the width of the web of film 12 on a transverse track 140 to seal, by forming adjacent cross-wise end seals 121a, 121b, and to cut, between the adjacent cross-wise end seals 121a, 121b, the web of film 12 against an opposing transverse bar 142. For example, wheel 134 can be rotated to travel along the track 140 by way of a motor 144 rotating a pinion gear 146 to travel along a rack gear 148 mounted on one side of a transverse support 150, the track 140 being mounted on the opposite side of the support 150. A linear bearing 152 can be mounted to plate 138 to ride in track 140 and facilitate smooth translation of the device 130 as it travels the width of the web of film 12.

Referring to FIG. 5, the machine 10 can further include a second sealing assembly 160 that forms a lengthwise side seal 161 in the web of film along the second lengthwise edge of the web of film 12, i.e. to seal the free edges 28, 28 of film panels 20, 20 together. For example, the second sealing assembly 160 can comprise a rotary wheel 162 with a heating element 164 mounted therearound. The rotary heat sealing assembly 160 can be configured to periodically move out of contact with the web of film 12 to provide unsealed regions along the length of the seal to function as out-gassing vents to permit escape of gases generated by the foam forming between the panels 20, 20.

Referring back to FIG. 1, the machine 10 can further comprise pre-heated reservoirs 170, 172 for the first and second foam components supplied to the valve assemblies 14, 14 via supply lines 60, 62. These pre-heated reservoirs 170, 172 allow one to not heat the supply lines 60, 62 themselves if desired.

Figure 7:
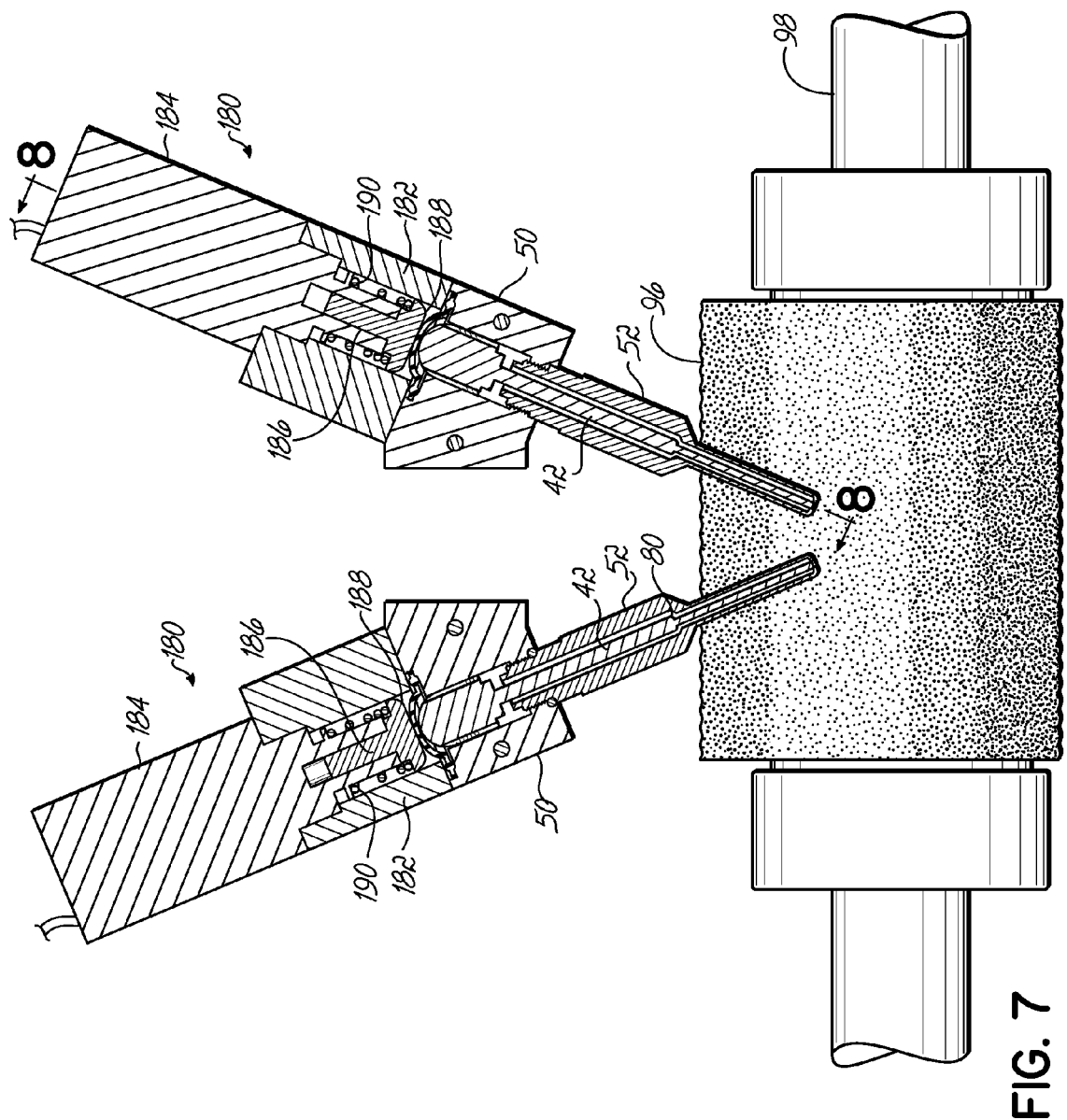
FIG. 7 is a cross-sectional view similar to FIGS. 4A and 4B of another embodiment of the dispensing assembly.
Figure 8:
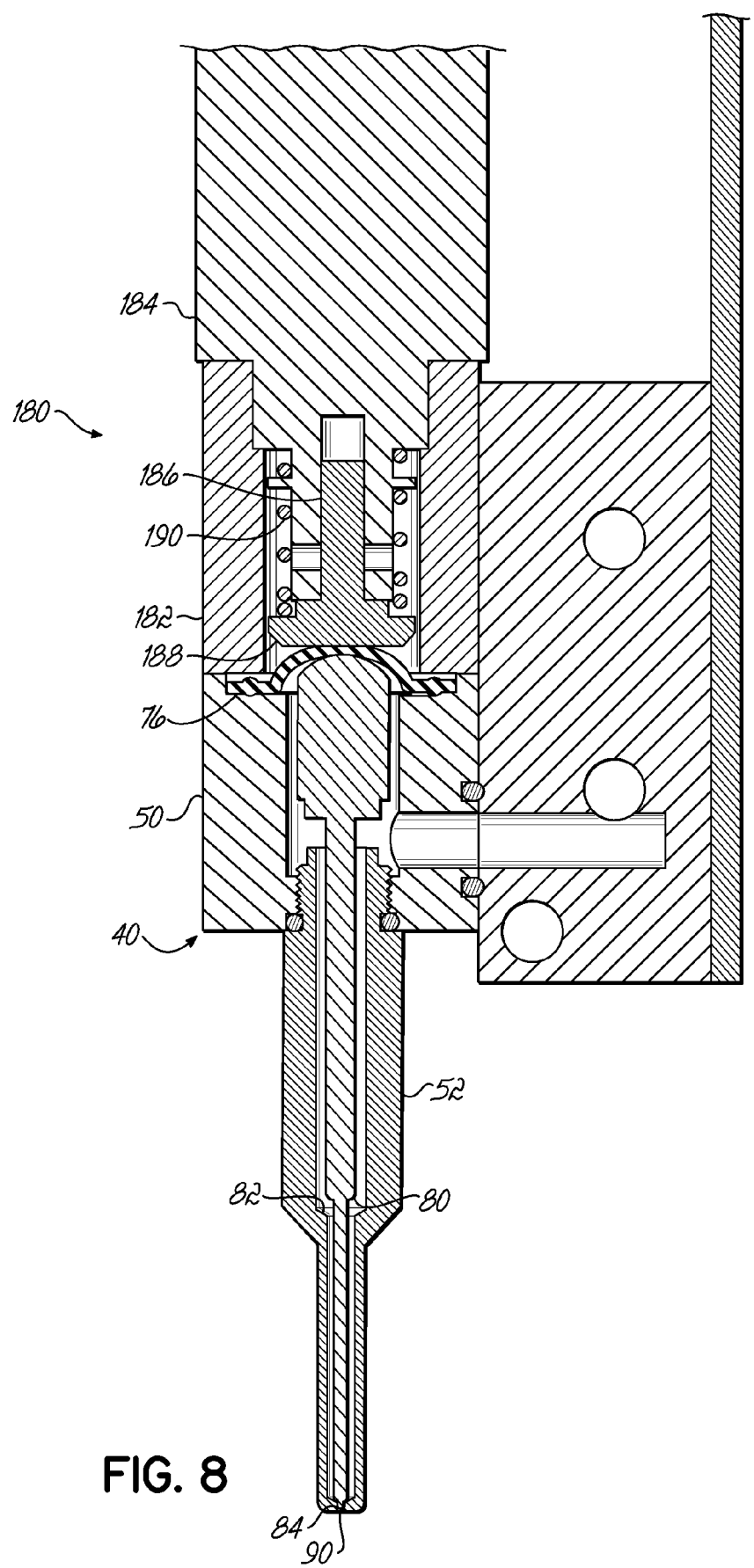
FIG. 8 is a cross-sectional view taken along line 8-8 in FIG. 7.

As mentioned above, an actuator 64 is adapted to apply and remove a force to and from the end 66 of the valve needle 42 in order to open and close the valve assembly 30. Referring to FIGS. 7 and 8, as another example, actuator 64 can be an electric solenoid 180. Solenoid 180 can have a first housing portion 182 secured to housing valve housing 40 and a second housing portion 184 securable to first portion 182. A plunger 186 is positioned to move axially in the housing portions 182, 184, and has a head 188 to apply and remove a force to and from the end 66 of the valve needle 42 to open and close the valve assembly 30. Plunger 186 is spring biased toward an extended position via spring 190 and is movable to a retracted position via the electromagnetic action of the solenoid 180 thereby allowing spring 190 to unseat shoulder 80 of valve needle 42 from cooperating shoulder 82 of extension 52 of valve housing 40.

Figure 9:
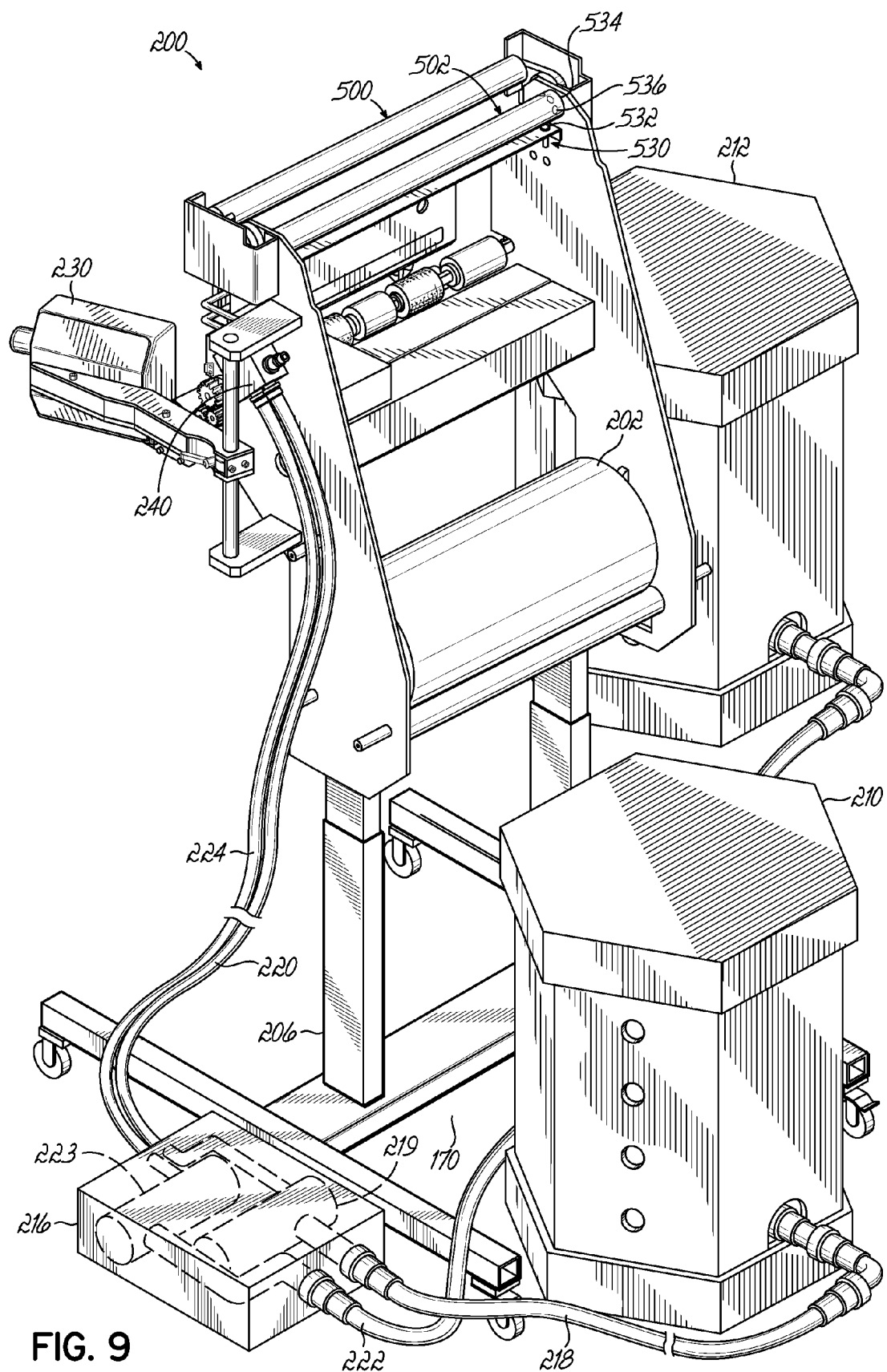
FIG. 9 is a rear perspective view of another embodiment of a machine for making foam cushions.

Referring now to FIGS. 9-15C, another embodiment 200 of a machine for forming foam cushions is illustrated. Referring to FIG. 9, machine 200 comprises, broadly, a supply of a web of plastic film 202 and a pair of foam dispensing assemblies 204, 204. While a pair of dispensing assemblies 204, 204 are illustrated, the machine 200 could include more than two dispensing assemblies. The film supply 202 and pair of foam dispensing assemblies 204, 204 can be supported on a machine frame 206. The web of film 202 could be formed to include a gusset fold (not shown) at one or both of the lengthwise edges to allow the film panels to expand and separate during expansion of the forming foam.

A first supply drum or bag-in-box 210 supplies a first foam component to the machine 200, and a second supply drum or bag-in-box 212 supplies a second foam component to the machine 200. As used herein, the term "supply drum" is deemed to embrace all manner of supply containers. A pump box 216, external to the first and second drums 210, 212, can be utilized to house a first supply pump 219 and a second supply pump 223. Pump box 216 can simply be placed on a floor surface. The pumps can be, for example, positive displacement external gear miniature pumps mounted to BLDC motors via magnetic couplers. An example of a suitable pump/motor is available from Tuthill as model number DXS2.3. The first supply pump 219 is connected to a lower end or bottom of the first supply drum 210 on one side via a hose 218, and is connected to the machine 200 on the other side via a hose 220. Similarly, the second supply pump 223 is connected to a lower end or bottom of the second supply drum 212 on one side via a hose 222, and is connected to the machine 200 on the other side via a hose 224. Any or all of the hoses 218, 220, 222, 224 can be heated by a heater wire running inside the hose to warm the foam constituents to promote the foam chemical reaction. As illustrated the pumps/motors in pump box 216 are gravity fed from the supply drums 210, 212. This avoids placing each pump through the bung at the top of its respective supply drum and resting the pump on the bottom of the drum in the chemical. Therefore, an operator is not required to lift a heavy pump out of an emptied drum, which will necessarily drip chemicals on the floor, and then lift the pump again to place the pump in a new full drum. This technique also avoids the use of pressurized chemical containers, which have been used in the past to avoid using suction capable pumps placed directly in the chemical drums. Such pressurized chemical containers use nitrogen pressure to force the chemicals out of the container to the foam machine. They are heavy and run the risk of a leak blowing chemicals out at high pressure. The present technique of supplying the chemicals to the machine 200 does away with lifting heavy pumps and risking spilled chemicals. If for whatever reason it is necessary to install a "dip tube" in the top of the drum (rather than connecting to the bottom of the drums as shown), the pumps/motors specified herein are capable of drawing the chemical from the drum and supplying it to the machine.

Figure 16:
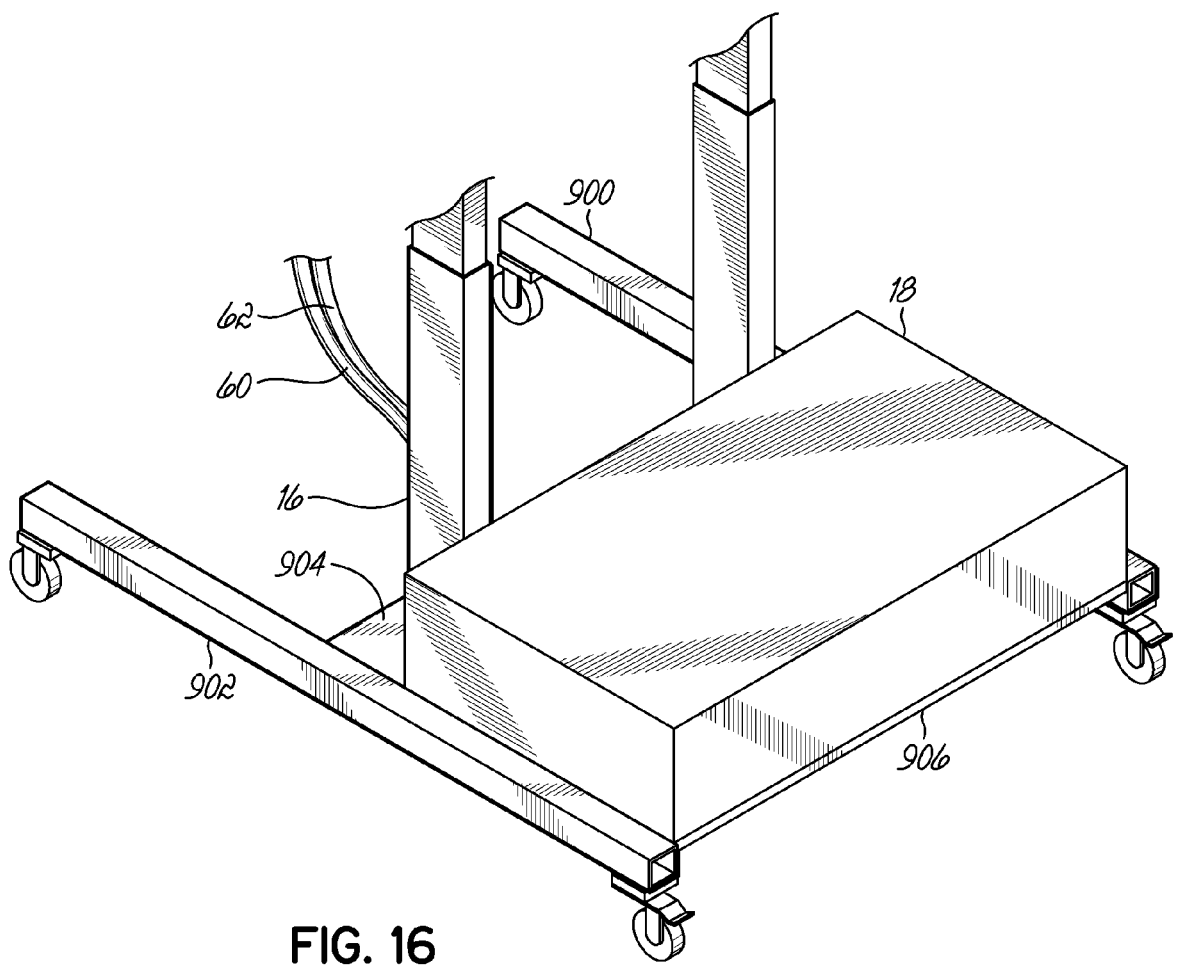
FIG. 16 is an enlarged perspective view of the base of the machines of FIGS. 1 and 9.

The machine 200 can include a controller such as a touch screen interface 230 mounted at a convenient height for a user. The touch screen interface 230 can control all the functions of the machine 200 in conjunction with a computer/processor, and can include, for example, the ability to display pictures, diagrams, video, and help tutorials. Referring to FIG. 16, the computer/processor and associated electronics can be housed in an electronics box 18 mounted on the base of the machine frame 16 or 206. The machine frame 16 or 206 can include spaced apart legs 900, 902 interconnected with a transverse brace 904. A support plate 906 can be mounted to legs 900, 902 and brace 904 upon which to mount the electronics box 18. Such a mounting location lowers the center of gravity of the machine making the machine more stable during use and transport.

Figure 11:
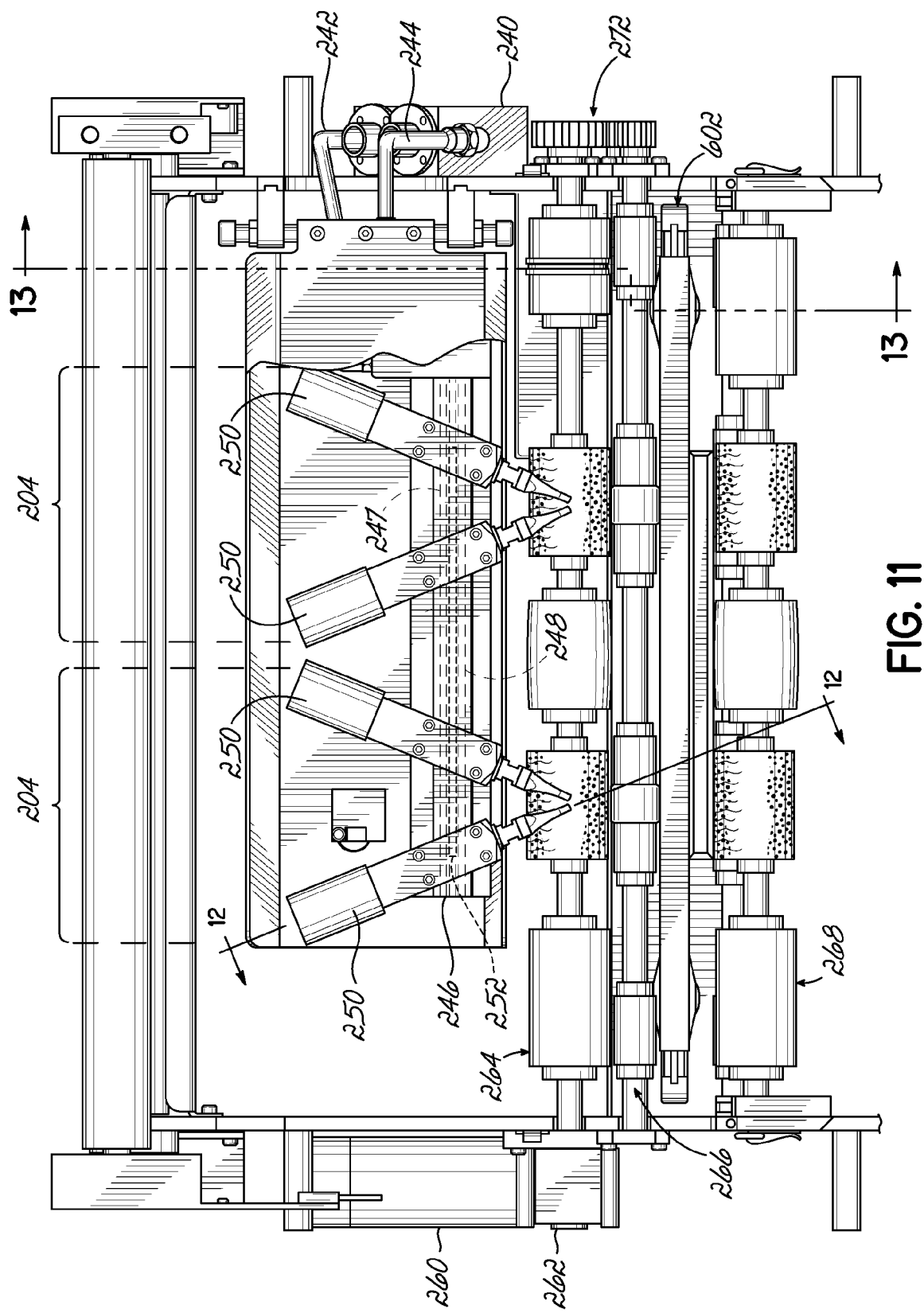
FIG. 11 is a front view, partially broken away, of the machine of FIG. 9.

Referring to FIGS. 9 and 11, hoses 220, 224 are connected to a block 240 which includes supply lines 242, 244 that supply the first and second foam components to a manifold plate 246 to which the dispensing assemblies 204, 204 are mounted. Each dispensing assembly 204 comprises first and second valve assemblies 250, 250. The manifold 246 includes an internal passageway 247 that channels the first foam component to one of the valve assemblies 250 and an internal passageway 248 that channels the second foam component to the other of the valve assemblies 250 of each of the dispensing assemblies 204, 204. A cartridge heater 252 can be positioned in the manifold 246 between the passageways 247, 248 to warm the manifold 246 and the valve assemblies 250, 250 to promote the foam chemical reaction. An example of a suitable cartridge heater is available from Watlow as model number E-12A-12022.

Referring to FIGS. 10, 11, and 11A-C, the machine 200 can include a variable speed film advance motor 260 connected via a gear box 262 to primary drive rollers 264 and secondary drive rollers 266, which cooperate with primary idler rollers 268 and secondary idler rollers 270, to advance the web of film. As illustrated secondary drive rollers 266 are driven through gear set 272 drivingly interconnecting the primary drive rollers 264 and secondary drive rollers 266. Examples of acceptable film feed speeds range from about 1 inch per second to about 12 inches per second. The secondary rollers 266, 270 are positioned downstream of the primary rollers 264, 268. The primary drive and idler rollers 264, 268 can take the form of a first relatively rigid roller 280 outboard of the first foam dispensing assembly 204, a second relatively rigid roller 282 outboard of the second foam dispensing assembly 204, a third relatively rigid roller 284 between the first and second foam dispensing assemblies 204, 204, a first relatively flexible roller 286 generally aligned with the first foam dispensing assembly 204, and a second relatively flexible roller 288 generally aligned with the second foam dispensing assembly 204. The first, second, and third relatively rigid rollers 280, 282, 284 can be fabricated out of, for example, polyurethane or rubber. The first and second relatively flexible rollers 286, 288 can be, for example, medium hard synthetic bristle brushes.

The secondary drive rollers 266 and idler rollers 270 can each comprise a first relatively rigid roller 300 outboard of the first foam dispensing assembly 204 and a second relatively rigid roller 302 outboard of the second foam dispensing assembly 204. The secondary drive rollers 266 can further comprise a third relatively rigid roller 304 generally aligned with the first dispensing assembly 204 and a fourth relatively rigid roller 306 generally aligned with the second foam dispensing assembly 204. Each of these rollers 304, 306 can have reduced diameter end portions 310, 312 and an increased diameter central portion 314. The secondary idler rollers 270 can further comprise a fifth generally rigid roller 320 generally aligned with the first foam dispensing assembly 204 and a sixth generally rigid roller 322 generally aligned with the second foam dispensing assembly 204. Each of these rollers 320, 322 can have increased diameter end portions 330, 332 and a decreased diameter central portion 334. The rollers 304, 306 cooperate with rollers 320, 322 to provide further mixing of the foam constituent components dispensed from the first and second valve assemblies 250, 250 of each dispensing assembly 204 over and above the mixing provided by primary bristle brush rollers 286, 288. The first, second, third, and fourth drive and idler secondary rollers 300, 302, 304, 306, 320, 322 can be fabricated of, for example, polyurethane or rubber. The primary and secondary idler rollers 268, 270 can be mounted in a cover 340 pivoted to machine 200 along an end of cover 340 as at 342 so as to pivot open and closed. See FIG. 13.

Figure 12A:
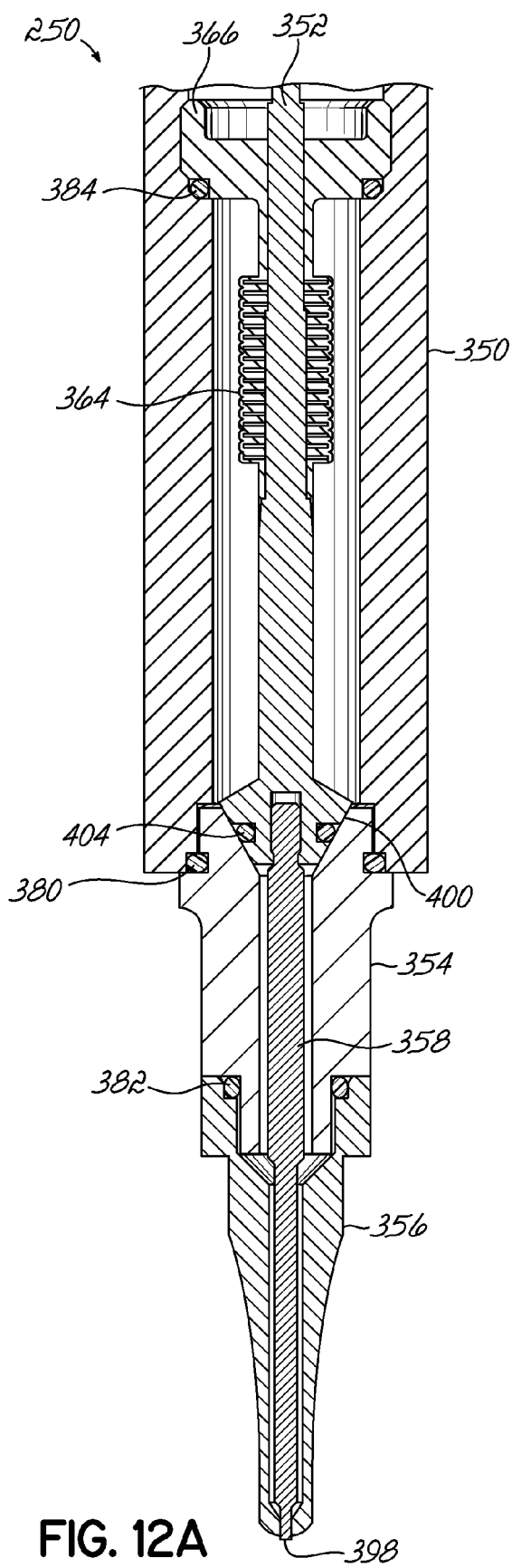
FIGS. 12A and 12B are cross-sectional views taken along line 12-12 in FIG. 11.
Figure 12B:
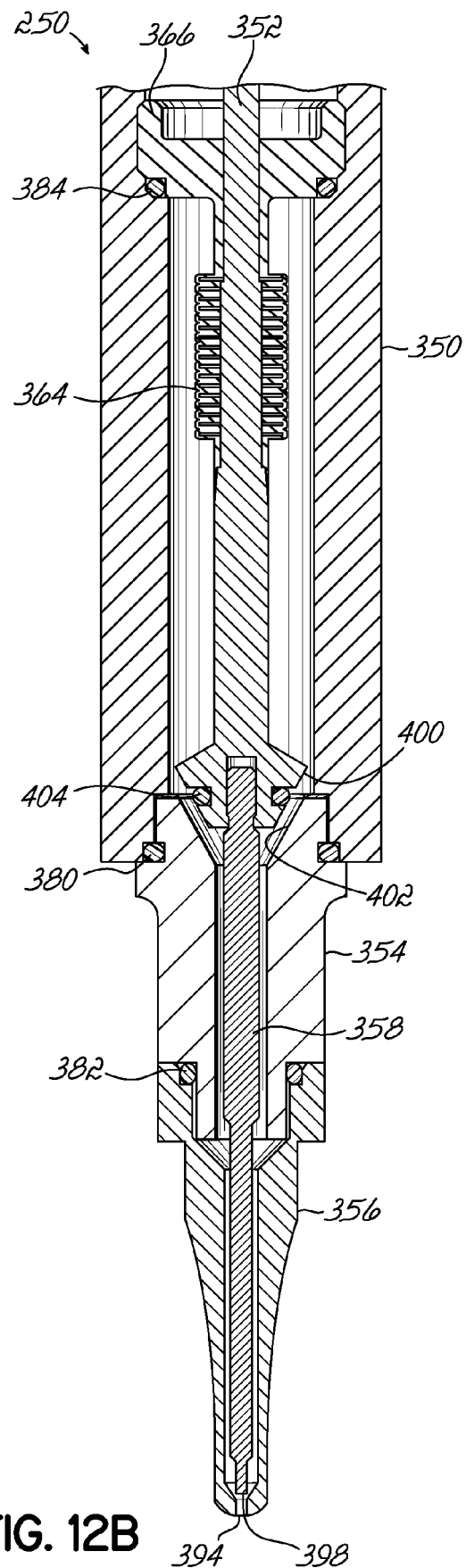

Referring to FIGS. 12A and 12B, the valve assembly 250 of this embodiment comprises a valve housing 350, a plunger 352 positioned in the valve housing 350, a needle guide 354 mounted on a distal end of the valve housing 350, a nozzle 356 mounted on a distal end of the needle guide 354, and a valve needle 358 mounted on a distal end of the plunger 352. A bellows spring 364 is fixed to plunger 352 and abuts a lower end of a plug 366 mounted to an upper end of valve housing 350. Bellows spring 364 normally biases the plunger 352 and hence needle 358 to a closed position, i.e. when plunger 352 is drawn upwardly in housing 350 by, for example, a solenoid actuator, the preload force in the bellows spring 364 is overcome and valve assembly 250 opens. The housing 350, needle guide 354, and nozzle 356 can be attached to one another by, for example, threading, and their interfaces can include o-rings 380, 382, respectively, to seal therebetween. Likewise, plug 366 can be threaded to housing 350 and can include an o-ring 384 seal therebetween. As in the prior embodiment, the valve needle 358 includes a tip 398 that can extend out of, or beyond the end of, the needle guide 356 and provide a self-cleaning function for the orifice 394 during actuation of the valve needle 358. Compare FIG. 12B which shows the valve needle 358 withdrawn from the orifice 394 and FIG. 12A which shows the valve needle 358 closing orifice 394. This design effectively wipes the orifice 394 clean after every "shot," and keeps the orifice 394 open in between "shots." To provide sealing, plunger 352 can include a shoulder 400 that cooperates with a shoulder 402 of the needle guide 354. An o-ring seal 404 can be used to provide additional sealing between shoulder 400 and shoulder 402.

Figure 11A:
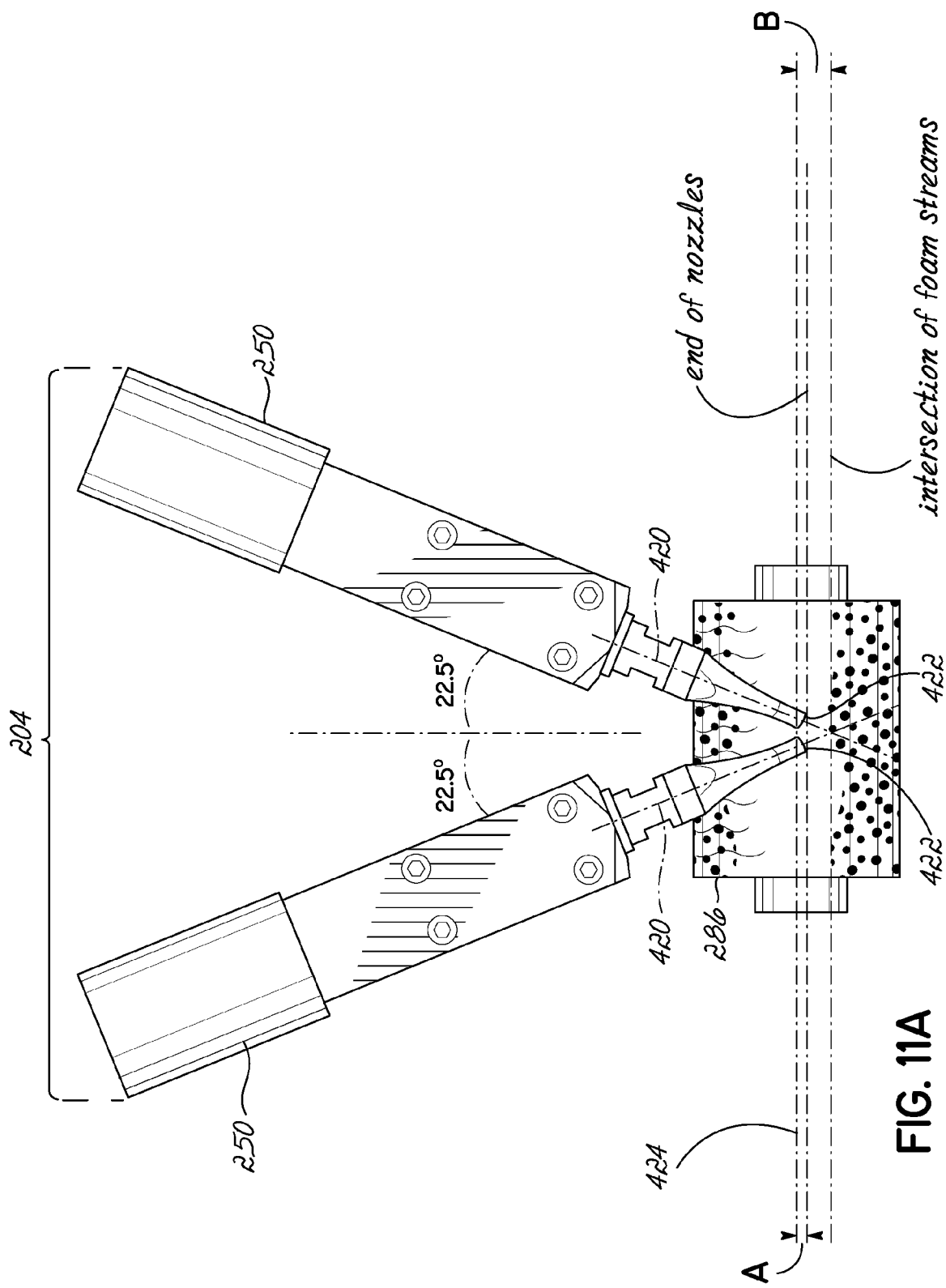
FIG. 11A is an enlarged view of one of the dispensing assemblies of FIG. 11.
Figure 11B:
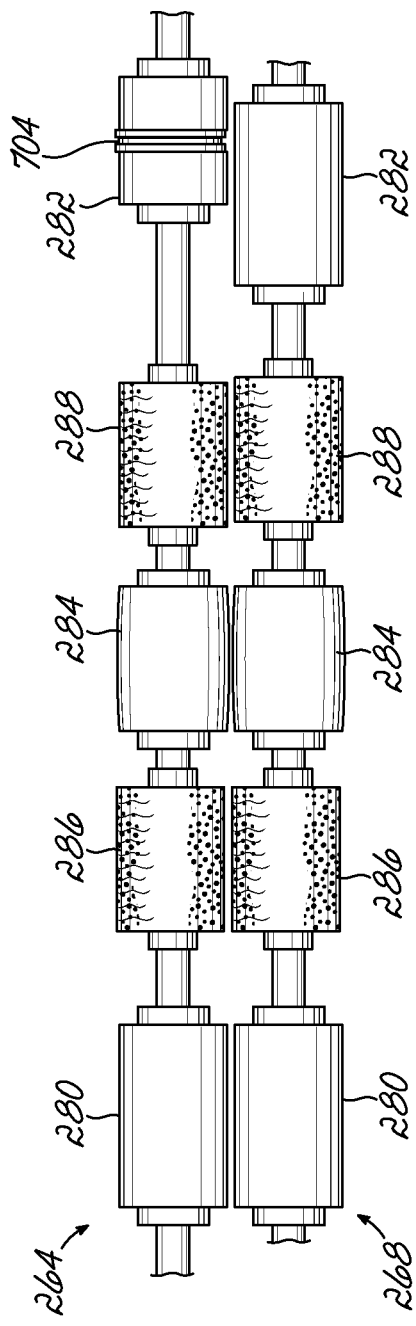
FIG. 11B is a top view of the primary drive and idler rollers of the machine of FIG. 9.
Figure 11C:
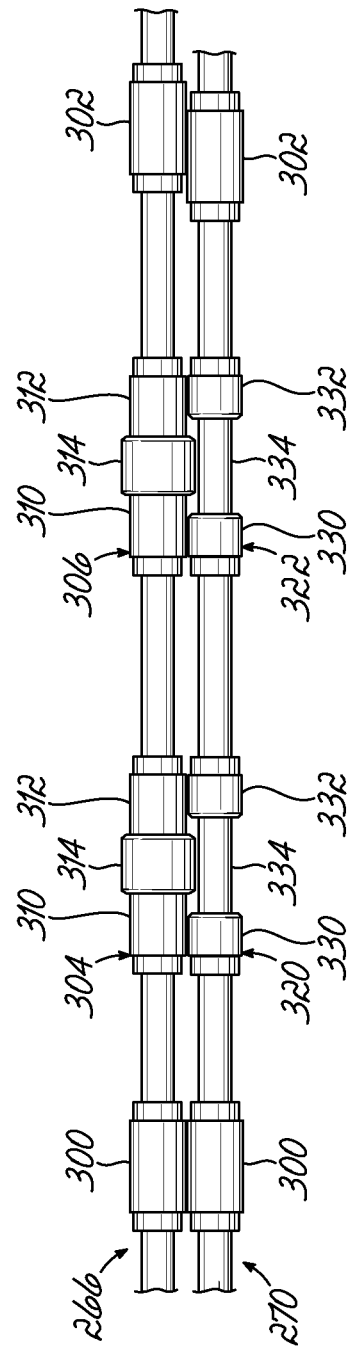
FIG. 11C is a top view of the secondary drive and idler rollers of the machine of FIG. 9.

Referring to FIG. 11A, each of the first and second valves 250 of each dispensing assembly 204 has a center line axis 420 and a lower end 422 of nozzle 356. The primary drive and idler rollers have a center line axis 424. One example configuration of valves 250 relative to the center line axis 424 of the primary and idler rollers that has been found to successfully work is for each of the first and second valves 250 to be angled or oriented about 22.5 degrees from perpendicular to the center line axis 424 in opposite directions and for the lower or distal ends 422 of the nozzles 356 to be positioned about 0.8 mm downstream of the center line axis 424 (distance "A" shown in FIG. 11A). This places the intersection of the center line axes 420 of the first and second valves 250 (and hence the intersection of the first and second foam component streams) about 8.3 mm downstream of the center line axes 424 (distance "B" shown in FIG. 11A). Other configurations could also work acceptably. Examples of acceptable flow rates of foam chemical from all four of the valves 250 combined range from about 0.5 gallons per minute to about 1.2 gallons per minute.

Figure 10:
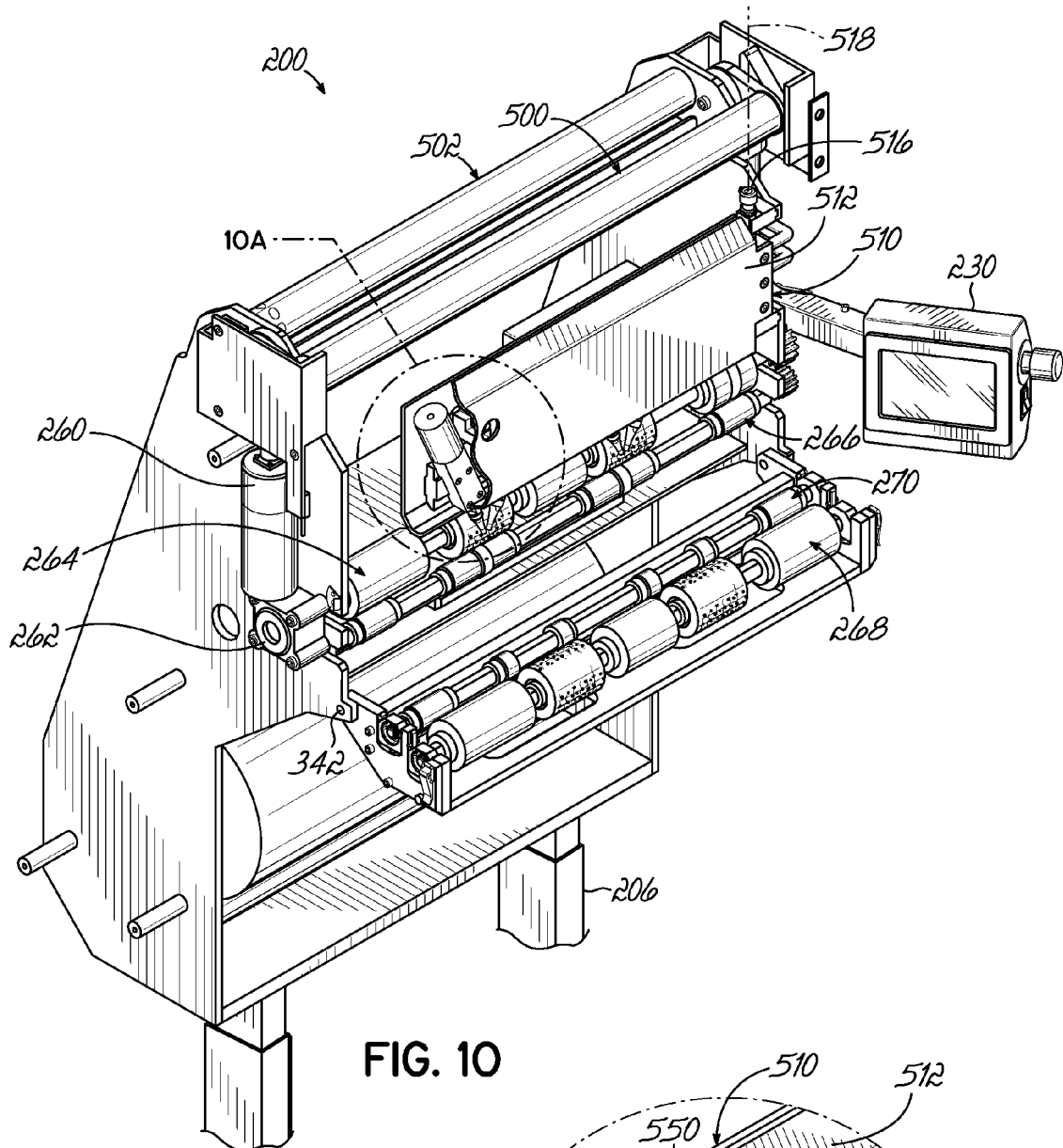
FIG. 10 is a front perspective view, partially broken away, of the machine of FIG. 9.
Figure 10A:
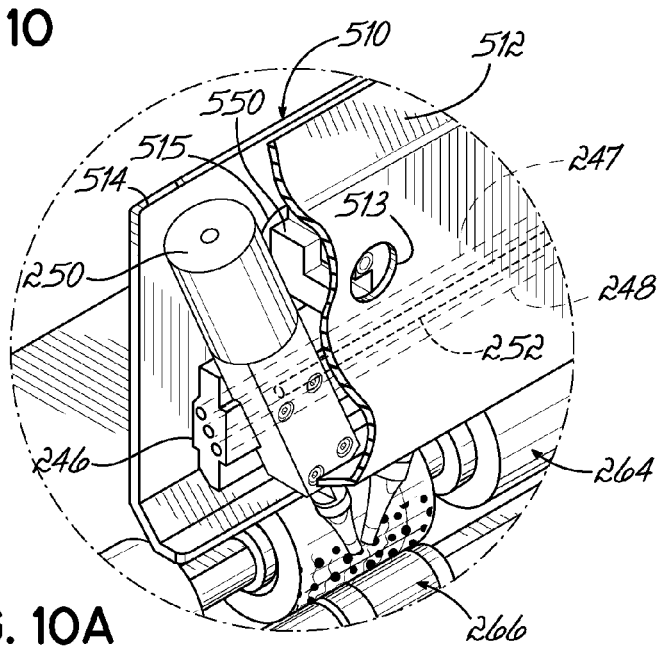
FIG. 10A is an enlarged view of the circled region 10A in FIG. 10.

Referring to FIGS. 9, 10, and 10A, the machine 200 can include one or a pair of idler rollers 500, 502 positioned at the top of the machine 200. The film web 202 travels upwardly from the supply roll, over rear idler roller 502, forwardly over forward idler roller 500, and then downwardly toward dispensing assemblies 204, 204. Dispensing assemblies are housed within a film panel divider structure 510 which includes a front divider plate 512 and a rear divider plate 514. As the film web 202 travels downwardly from idler roller 500 toward the dispensing assemblies 204, 204 the front film panel 520 slides over and in front of front divider plate 512 and the rear film panel 522 slides over and in back of rear divider plate 514. See also FIG. 14. To facilitate loading the film web 202 over the divider 510, the divider 510 can be hinged along one side (for example, the right side as seen by one facing the front of the machine) via hinge bolts 516, 517 so as to be able to swing forwardly pivoting about a generally vertical axis 518. See FIGS. 10, 13, and 14.

A "film out" sensor can be associated with one of the idler rollers 500, 502 to indicate when the machine 200 is out of film. A sensor 530 can be included to detect rotation of roller 502 induced by the web of film 202 traveling over the roller 502. The sensor 530 can be an encoder type sensor comprising a magnetic element 532 mounted adjacent an end 534 of idler roller 502. The end 534 of idler roller 502 can include holes 536 therein spaced circumferentially therearound. Rotation of the idler roller 502 is sensed by the magnetic element 532 as the holes 536 pass over or in front of the magnetic element 532 thereby providing an intermittent signal indicating rotation of the idler roller 502 and hence presence of the film traveling over the roller 502. Once rotation of idler roller 502 stops the signal generated by holes 536 passing in front of magnetic element 532 likewise stops indicating that the roller 502 is no longer rotating and hence no film is passing over roller 502. An example of a suitable magnetic element 532 is available from Contrinex as model number DW-AD-403-M5.

A "film properly loaded" sensor can be associated with the film panel divider structure 510 to indicate that one of film panels is forward of the divider 510 and the other of the film panels is aft of the divider 510, in other words that the film is properly loaded on the machine 200. A sensor 550 can be mounted between the divider plates 512, 514 which detects one film panel 520 forward of the dispensing assemblies 204, 204 and the other film panel 522 aft of the dispensing assemblies 204, 204. The sensor 550 can be a so-called "photo eye" comprising a double ended infrared light transmitter and receiver (or two oppositely directed single ended infrared light transmitters/receivers). Holes 513, 515 in plates 512, 514, respectively allow infrared light to reach the film panels. As used herein, "double ended" is deemed to embrace both a single infrared light transmitter and receiver body which transits and receives from both ends, as well as a pair of oppositely directed single infrared light transmitter and receiver bodies. When one film panel is forward of the infrared light transmitter and receiver and the other film panel is rearward of the infrared light transmitter and receiver, infrared light from the transmitter is reflected by the film panels and is received by the receiver thereby indicating that the film panels are properly located and that the machine 200 is properly loaded with film. An example of a suitable infrared light transmitter and receiver is available from Pepperl & Fuchs as model number KT11-50-25-102-115.

Figure 13:
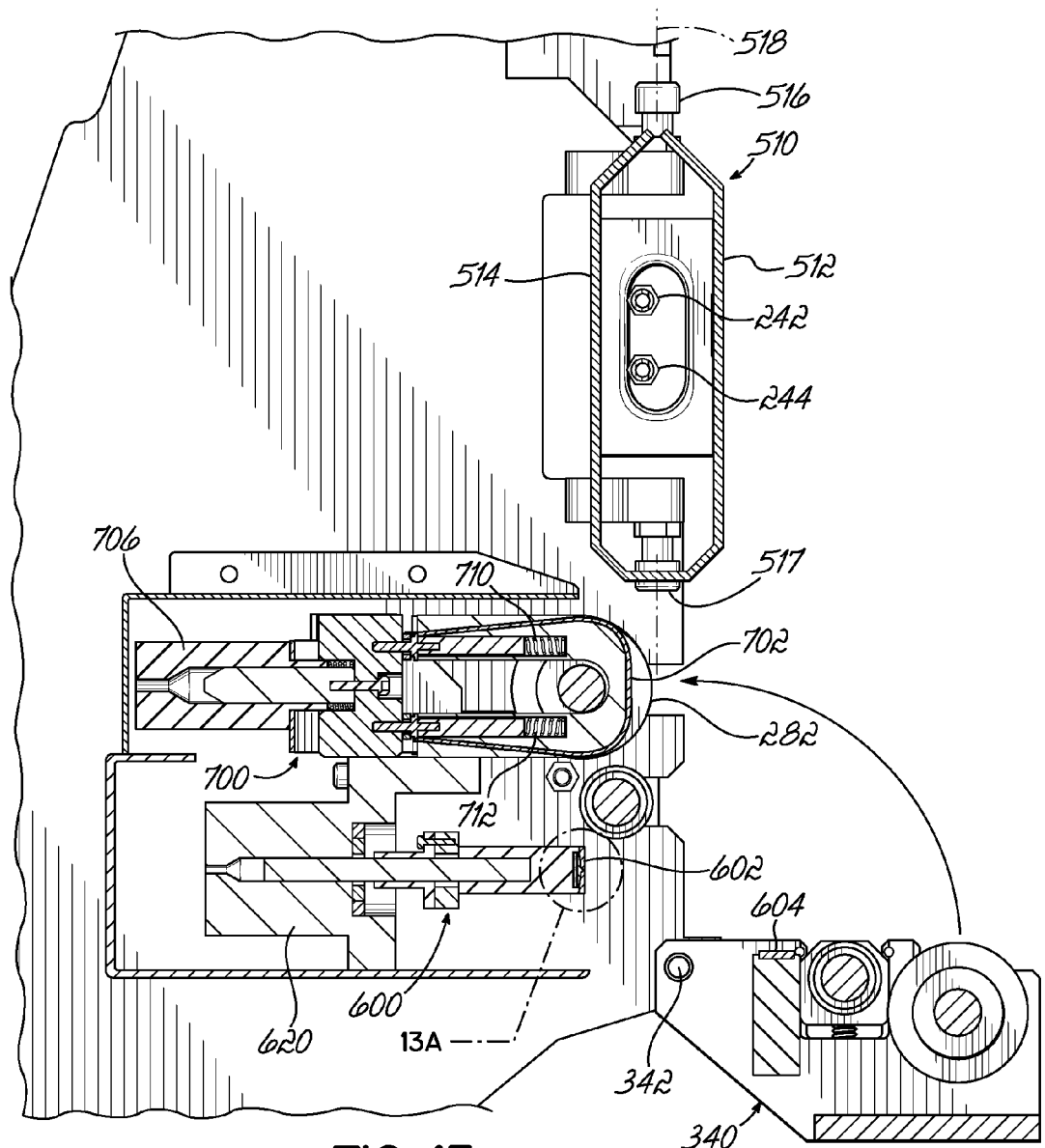
FIG. 13 is an end view, partially broken away, of the machine of FIG. 9.
Figure 13A:
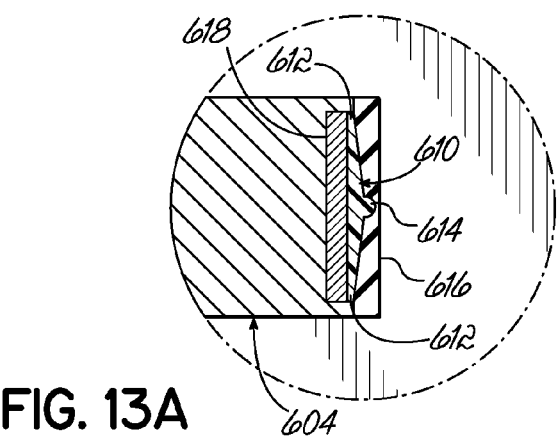
FIG. 13A is an enlarged view of the circled region 13A in FIG. 13.
Figure 14:
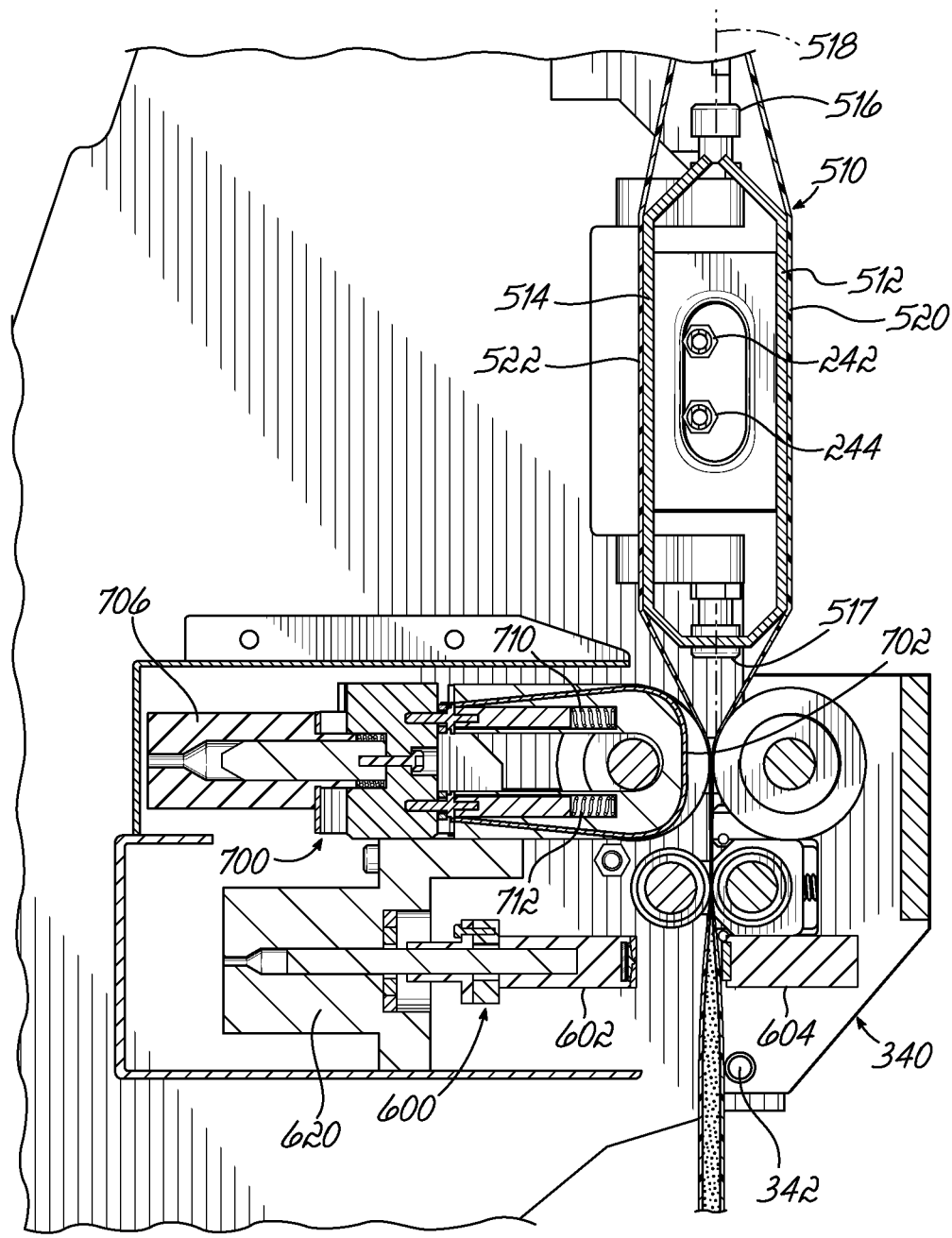
FIG. 14 is a view similar to FIG. 13 with the idler primary and secondary roller cover pivoted to the closed position.

Referring to FIGS. 13, 13A, and 14, a combination heat sealing and cutting device 600 is illustrated. The device 600 is operable to selectively either form a crosswise end seal in the web of film or form a crosswise end seal in the web of film and sever adjacent foam cushions from one another by severing the web of film within the crosswise end seal in the web of film. The device can comprise a variable voltage heated bar 602 movable into and out of contact with the web of film. To seal and sever, the heated bar 602 is supplied with a higher voltage, and to seal only the heated bar 602 is supplied with a lower voltage. By varying the voltage to the heat bar 602, the contact time and contact pressure of the bar 602 against the film web can be the same whether sealing only or sealing and severing. The device 600 can further comprise a backer bar 604 mounted in pivoting cover 340. The web of film 202 can thus be trapped between the heated bar 602 and the backer bar 604 during sealing and sealing/severing. Backer bar 604 can be fabricated of silicone covered with Teflon® tape. Heated bar 602 can comprise a heating element band 610 having a non-planar cross-section. The band 610 can have a cross-section having opposed edge regions 612 and a central region 614, where the central region 614 projects away from the opposed edge regions 612, 612 toward the backer bar 604. Teflon® tape 616 can be placed over band 610, and the band 610 can have insulation 618 along a rear side thereof. Or, Teflon® tape can be placed under the band 610 and the band 610 can be coated with Teflon®. An actuator, for example a lead screw 620, can be utilized to move the heated bar 602 into and out of contact with the film web. An example of a suitable heating element band 610 is available from Toss as model number 524-41922. The lead screw 620 is operable via the processor/controller to move the sealing band 610 into and out of contact with the film web at the appropriate intervals for the desired cushion length; likewise the processor/controller is operable to provide the appropriate voltage to the sealing band 610 to seal and seal and sever.

Referring to FIGS. 13 and 14, a side sealing device 700 is illustrated. The device 700 is operable to form a lengthwise side seal in the web of film and can take the form of a U-shaped sealing band 702 positioned in groove 704 of primary drive roller 282. See FIGS. 11 and 11B. A actuator, for example a solenoid plunger 706, can be used to move sealing band 702 forward (toward the film) and rearward (away from the film) against the bias of springs 710, 712. Sealing band 702 does not rotate with roller 282; rather, band 702 merely translates forwardly to an extent such that the band 702 contacts the film web, and translates rearwardly into groove 704 so as to be out of contact with the film web. The solenoid plunger 706 is operable via the processor/controller to move the sealing band 702 into contact with the film web for less than the entire length of the foam cushion to be produced so as to leave a "vent" in the side of the cushion for outgassing of the expanding foam.

Figure 15A:
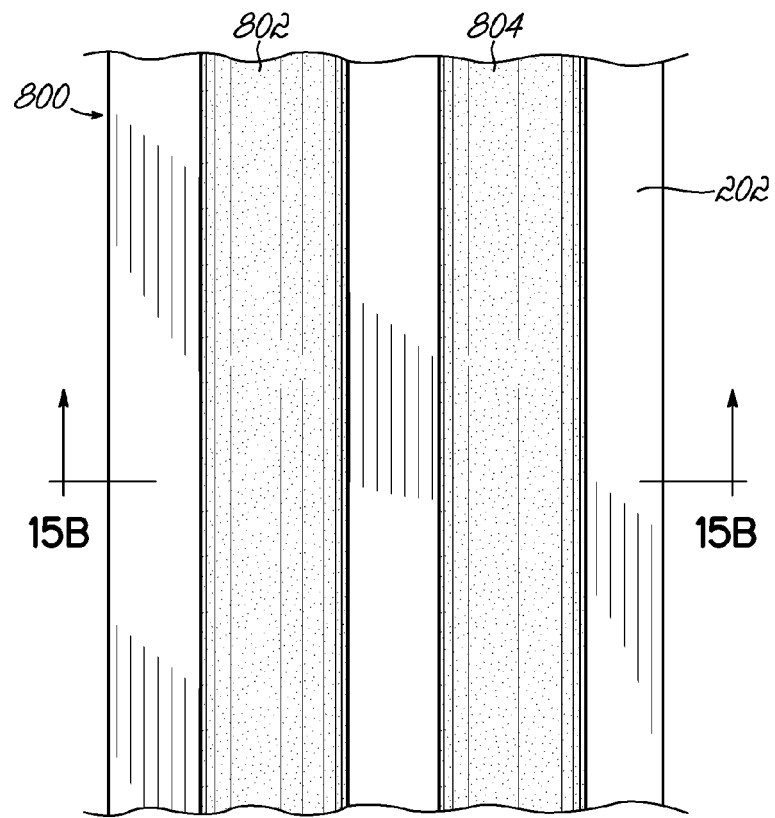
FIG. 15A is a top view of the cushioning product formed with the machine.
Figure 15B:
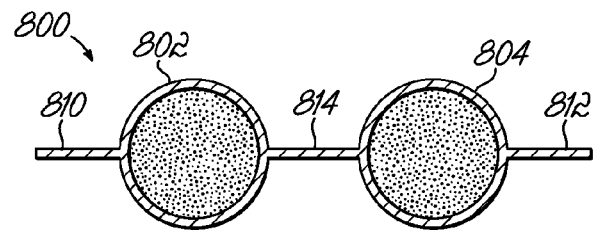
FIG. 15B is a view taken along line 15B-15B in FIG. 15A.
Figure 15C:
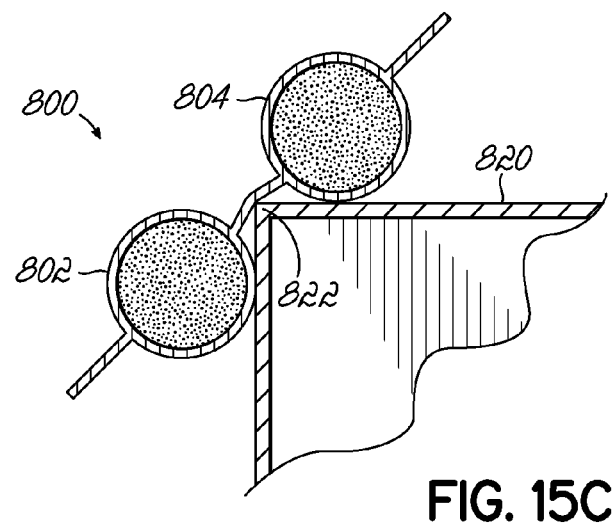
FIG. 15C is a view similar to FIG. 15B showing the cushioning product being used to wrap an item to be shipped.

Referring to FIGS. 15A, 15B, and 15C, one example of a foam cushion 800 that can be produced by the machine 200 is illustrated. The foam cushion 800 includes a pair of longitudinal foam strips or columns 802, 804 within the film web

202. Proper adjustment of the machine 200 produces lateral edge regions 810, 812 and a central region 814 which include little to no foam, i.e. just film web 202. Such a resulting foam cushion 800 enables one to advantageously wrap an article to be shipped, such as that shown at 820, by folding the cushion 800 around corners 822, etc.

The embodiments shown and described are merely for illustrative purposes only. The drawings and the description are not intended to limit in any way the scope of the claims. Those skilled in the art will appreciate various changes, modifications, and other embodiments. All such changes, modifications and embodiments are deemed to be embraced by the claims. Accordingly, the scope of the right to exclude shall be limited only by the following claims and their equivalents.

What is claimed is:

1. A cushioning product made from a selected length of a supply of an elongated web of film, the web of film having a longitudinal extent and a transverse extent, said cushioning product comprising:
   a pair of film panels positioned face to face and having a longitudinal extent and a transverse extent corresponding to the longitudinal extent and the transverse extent, respectively, of the web of film, and
   a pair of elongated, longitudinally extending and transversely spaced apart continuous columns of foam positioned between said film panels defining a cross-section taken across the transverse extent of said film panels that is constant along a length of said columns of foam,
   a longitudinally extending central region disposed between said pair of columns of foam that does not have any foam between said film panels,
   said film panels in said longitudinally extending central region being unconnected to one another,
   said film panels having a pair of transversely extending and longitudinally spaced apart end heat seals defining respective opposite ends of said cushioning product, said transversely extending end heat seals being perpendicular to the length of said longitudinally extending columns of foam, said film panels of at least one said end of said cushioning product having a severed edge.

2. The cushioning product of claim 1 wherein said film panels between said columns of foam function as a living hinge to facilitate wrapping of an item to be shipped.

3. The cushioning product of claim 1 further comprising at least one longitudinally extending side heat seal along one side of said cushioning product.

4. The cushioning product of claim 3 further comprising longitudinally extending opposite side regions that include little to no foam between said film panels.

5. The cushioning product of claim 3 wherein said web of film is a sheet of film folded lengthwise along a fold line to thereby define said pair of film panels, each film panel of said pair of film panels having a free edge opposite said fold line, said free edges sealed together by said longitudinally extending side seal.

6. The cushioning product of claim 1 wherein said longitudinally extending central region is free of longitudinally extending seals.

7. A cushioning product made from a selected length of a supply of an elongated web of film, the web of film having a longitudinal extent and a transverse extent, said cushioning product comprising:
   a pair of film panels positioned face to face and having a longitudinal extent and a transverse extent corresponding to the longitudinal extent and the transverse extent, respectively, of the web of film,
   a pair of elongated, longitudinally extending continuous strips of foam positioned between said film panels defining a cross-section taken across the transverse extent of said film panels that is constant along a length of said strips of foam,
   a longitudinally extending lengthwise edge heat seal along a lengthwise edge of said cushioning product sealing said film panels together, and
   a transversely extending crosswise edge heat seal along each opposite crosswise edge of said cushioning product sealing said film panels together,
   said pair of strips of foam being spaced apart transversely so as to define a longitudinally extending central region that does not have any foam between said film panels,
   said film panels in said longitudinally extending central region being unconnected to one another,
   said transversely extending crosswise edge heat seals being perpendicular to the length of said longitudinally extending strips of foam, said film panels of at least one said crosswise edge of said cushioning product having a severed edge.

8. The cushioning product of claim 7 wherein each strip of foam of said pair of strips of foam being spaced transversely inwardly from a respective lengthwise edge of said cushioning product so as to define a pair of opposite longitudinally extending lengthwise edge regions that include little to no foam between said film panels.

9. The cushioning product of claim 7 wherein said film panels between said strips of foam function as a living hinge to facilitate wrapping of an item to be shipped.

10. The cushioning product of claim 7 wherein said longitudinally extending central region is free of longitudinally extending seals.

11. The cushioning product of claim 7 wherein said web of film is a sheet of film folded lengthwise along a fold line to thereby define said pair of film panels, each film panel of said pair of film panels having a free edge opposite said fold line, said free edges sealed together by said longitudinally extending lengthwise edge seal.

12. A cushioning product made from a selected length of a supply of an elongated web of film, the web of film having a longitudinal extent and a transverse extent, said cushioning product comprising:
   a pair of film panels positioned face to face and having a longitudinal extent and a transverse extent corresponding to the longitudinal extent and the transverse extent, respectively, of the web of film, and
   only one pair of elongated, longitudinally extending and transversely spaced apart continuous columns of foam positioned between said film panels defining a cross-section taken across the transverse extent of said film panels that is constant along a length of said columns of foam,
   a longitudinally extending central region disposed between said pair of columns of foam that does not have any foam between said film panels,
   said film panels in said longitudinally extending central region being unconnected to one another,
   said film panels having a pair of transversely extending and longitudinally spaced apart end heat seals defining respective opposite ends of said cushioning product, said transversely extending end heat seals being perpendicular to the length of said longitudinally extending columns of foam, said film panels of at least one said end of said cushioning product having a severed edge.

13. The cushioning product of claim 12 wherein said film panels between said columns of foam function as a living hinge to facilitate wrapping of an item to be shipped.

14. The cushioning product of claim 12 further comprising at least one longitudinally extending side heat seal along one side of said cushioning product.

15. The cushioning product of claim 14 further comprising longitudinally extending opposite side regions that include little to no foam between said film panels.

16. The cushioning product of claim 14 wherein said web of film is a sheet of film folded lengthwise along a fold line to thereby define said pair of film panels, each film panel of said pair of film panels having a free edge opposite said fold line, said free edges sealed together by said longitudinally extending side seal.

17. The cushioning product of claim 12 wherein said longitudinally extending central region is free of longitudinally extending seals.

18. A cushioning product made from a selected length of a supply of an elongated web of film, the web of film having a longitudinal extent and a transverse extent, said cushioning product comprising:
 a pair of film panels positioned face to face and having a longitudinal extent and a transverse extent corresponding to the longitudinal extent and the transverse extent, respectively, of the web of film,
 only one pair of elongated, longitudinally extending continuous strips of foam positioned between said film panels defining a cross-section taken across the transverse extent of said film panels that is constant a length of said strips of foam,
 a longitudinally extending lengthwise edge heat seal along a lengthwise edge of said cushioning product sealing said film panels together, and
 a transversely extending crosswise edge heat seal along each opposite crosswise edge of said cushioning product sealing said film panels together,
 said pair of strips of foam being spaced apart transversely so as to define a longitudinally extending central region that does not have any foam between said film panels,
 said film panels in said longitudinally extending central region being unconnected to one another,
 said transversely extending crosswise edge heat seals being perpendicular to the length of said longitudinally extending strips of foam, said film panels of at least one said crosswise edge of said cushioning product having a severed edge.

19. The cushioning product of claim 18 wherein each strip of foam of said pair of strips of foam being spaced transversely inwardly from a respective lengthwise edge of said cushioning product so as to define a pair of opposite longitudinally extending lengthwise edge regions that include little to no foam between said film panels.

20. The cushioning product of claim 18 wherein said film panels between said strips of foam function as a living hinge to facilitate wrapping of an item to be shipped.

21. The cushioning product of claim 18 wherein said longitudinally extending central region is free of longitudinally extending seals.

22. The cushioning product of claim 18 wherein said web of film is a sheet of film folded lengthwise along a fold line to thereby define said pair of film panels, each film panel of said pair of film panels having a free edge opposite said fold line, said free edges sealed together by said longitudinally extending lengthwise edge seal.

\* \* \* \* \*